US008011405B2

(12) United States Patent
Sleiman et al.

(10) Patent No.: US 8,011,405 B2
(45) **Date of Patent: *Sep. 6, 2011**

(54) LABELLER

(75) Inventors: Joseph Z. Sleiman, Leamington (CA); Michael R. Schram, Comber (CA); Douglas F. Lovegrove, Comber (CA); Bradley V. Allen, Amherstburg (CA)

(73) Assignee: Joe & Samia Management Inc., Leamington, Ontario (CA)

( * ) Notice: Subject to any disclaimer, the term of this patent is extended or adjusted under 35 U.S.C. 154(b) by 170 days.

This patent is subject to a terminal disclaimer.

(21) Appl. No.: 12/435,951

(22) Filed: May 5, 2009

(65) Prior Publication Data

US 2009/0272493 A1 Nov. 5, 2009

Related U.S. Application Data

(60) Provisional application No. 61/050,600, filed on May 5, 2008.

(51) Int. Cl.
*B32B 41/00* (2006.01)

(52) U.S. Cl. ........ 156/358; 156/361; 156/366; 156/367; 156/368; 156/387; 156/538; 156/541

(58) Field of Classification Search .................. 156/358, 156/361, 366, 367, 368, 387, 538, 541; 242/364, 242/538.1, 345.1
See application file for complete search history.

(56) References Cited

U.S. PATENT DOCUMENTS 4,015,292 A * 3/1977 Kirn ........................ 360/130.23
4,330,097 A 5/1982 George et al.
4,547,252 A 10/1985 Lamers
5,380,381 A 1/1995 Otruba
5,628,468 A * 5/1997 Jung et al. .................. 242/345.1
5,730,816 A * 3/1998 Murphy .......................... 156/64
6,179,030 B1 * 1/2001 Rietheimer ................... 156/360

(Continued)

FOREIGN PATENT DOCUMENTS

WO 2008/046222 4/2008

OTHER PUBLICATIONS

International Preliminary Report on Patentability, dated Nov. 9, 2010, for International Application No. PCT/CA2009/000587, filed May 5, 2009.

(Continued)

*Primary Examiner* — George Koch
(74) *Attorney, Agent, or Firm* — Warner Norcross & Judd LLP

(57) ABSTRACT

A labeller includes a waste liner rewind wheel for taking up the release liner after it has been separated from the labels, and a print mechanism positioned along the label path for real-time printing of a desired print material on the labels. In one embodiment, the waste liner rewind wheel includes a mechanism for adjusting the speed of the rewind wheel as the amount of waste liner on the rewind wheel increases, while maintaining sufficient tension on the waste liner to pull the waste liner onto the rewind wheel. In another embodiment, the print mechanism is mounted to the frame along the label path, such that the print mechanism is capable of printing on the labels as they are moved past the print mechanism. The labeller may additionally include an encoder for registering the position of the label web with respect to the print mechanism.

18 Claims, 28 Drawing Sheets

U.S. PATENT DOCUMENTS

| | | | | |
|---|---|---|---|---|
| 6,257,294 | B1 * | 7/2001 | Weisbeck | 156/356 |
| 6,561,246 | B2 | 5/2003 | Yang | |
| 6,764,235 | B2 | 7/2004 | Coret et al. | |
| 6,942,403 | B2 | 9/2005 | Hohberger et al. | |
| 2003/0221788 | A1 | 12/2003 | Dods | |
| 2004/0011915 | A1 * | 1/2004 | Korthauer | 242/563.1 |
| 2004/0089423 | A1 * | 5/2004 | Nielsen | 156/542 |
| 2004/0154749 | A1 | 8/2004 | Rice | |
| 2005/0279463 | A1 | 12/2005 | Ridenour | |
| 2010/0101731 | A1 * | 4/2010 | Sleiman et al. | 156/358 |

OTHER PUBLICATIONS

International Search Report, dated Aug. 25, 2009, for International Application No. PCT/CA2009/000587, filed May 5, 2009.

* cited by examiner

LABELLER

BACKGROUND OF THE INVENTION

The present invention is directed to a labeller for applying labels to products, and more particularly to a labeller for indexing labels from a label web and tamping the labels onto the products.

Labellers are well known for applying labels to items such as fruits, vegetables or other consumer goods. These devices typically include a label wheel that receives and holds a roll of label web, including a plurality of labels supported sequentially on a release liner. The label web is advanced from the wheel through the labeller to an edge, typically called a peel plate. The web is pulled over the edge of the peel plate to separate the labels from the support liner, allowing the labels to be deposited onto the items.

Many labellers including a tamping mechanism that can extend to deposit a label onto an item. For instance, it is common for labellers to include one or more tamping bellows, which include a tamping face in communication with a vacuum source and a positive pressure source, and are moveable between a retracted position and an extended tamping position. The tamping face of the bellows may be moved to a position adjacent to the peel plate to receive a label as the label web is indexed over the peel plate. The tamping bellows may then carry the label, using the vacuum source to hold the label on the tamping face, to a position in which the bellows communicates with a positive pressure source to extend the bellows and tamp the label onto an item to be labeled.

Although prior art labellers are generally acceptable, problems arise in a number of aspects of these labellers. For instance, difficulties arise with the release liner after the labels have been removed. The amount of this waste release liner continues to grow as additional labels are deposited onto items, creating a messy "tail" of release liner that can obstruct the user and the labeller until the user tears off or moves the tail—only to have the tail quickly grow back again.

Additional problems with prior art label webs include the replacement of label webs for labelling different types of products. In most cases, the labels on each label web are provided in a roll and are all preprinted with the same printed material for identifying a specific type of product. As a result, each time the labeller will be used to label a different type of product, the label web must be removed and replaced with another label web with the appropriate printed material for the new product to be labeled. In situations where many different types of items must be labeled and many label web changes need to be made, this type of labeller becomes inefficient.

SUMMARY OF THE INVENTION

The present invention provides a labeller that includes a waste liner rewind wheel for taking up the release liner after it has been separated from the labels, and a print mechanism positioned along the label path for real-time printing of a desired print material on the labels.

In one embodiment, the labeller includes a frame for supporting a plurality of labeller components, an extendable tamping bellows connected to the frame, a label wheel mounted on a rotatable shaft extending from said frame, the label wheel capable of supporting a label web, a peel plate mounted to the frame adjacent to the tamping bellows, a drive wheel mounted to the frame that is capable of pulling the release liner from the label wheel and around the peel plate, and a waste liner rewind wheel mounted on the shaft.

The waste liner rewind wheel may include a mechanism for adjusting the speed of the rewind wheel as the amount of waste liner on the rewind wheel increases while maintaining sufficient tension on the waste liner to pull the waste liner onto the rewind wheel. In one embodiment, the rewind wheel includes a core that receives the shaft, and a hub extending around the core. The hub frictionally engages the core such that the hub is capable of slipping with respect to the core as when a threshold amount of tension is applied by the waste liner.

In another embodiment, the print mechanism is mounted to the frame along the label path, such that the print mechanism is capable of printing on the labels as they are moved past the print mechanism. The labeller may additionally include an encoder for registering the position of the label web with respect to the print mechanism. In one embodiment, the print mechanism is moveable on the frame to provide for adjustment of the location at which the labels are printed.

In yet another embodiment, the labeller includes a rotating turret mounted to the frame. The turret includes an outer circumferential surface that supports a plurality of the tamping bellows. The turret may include an inner surface that faces the frame, and includes a plurality of port holes, with each port hole in fluid communication with one of the tamping bellows. The frame may include a positive pressure port and a vacuum port that are defined in the surface of the frame and extend around portions of the turret axis. As the turret rotates, the port holes on the turret communicate with the positive pressure port and the vacuum port. The vacuum port and the positive pressure port are positioned to provide a vacuum source to the bellows around substantially all of the bellows' rotation, and to provide a brief positive pressure source to the bellows at the position in which the bellows must extend to tamp a label onto a product.

The waste liner rewind wheel increases the efficiency of the labeller by reducing the need for a user to tear off or otherwise dispose of the waste release liner during operation of the labeller. The print mechanism mounted to the labeller enables a user to label one or more labels with a desired printed material in real-time, and to change the printed material as desired. The communicating ports on the turret and frame provide an integrated method for delivering the positive pressure source and the vacuum source to the tamping bellows.

DETAILED DESCRIPTION OF THE CURRENT EMBODIMENTS

Figure 1:
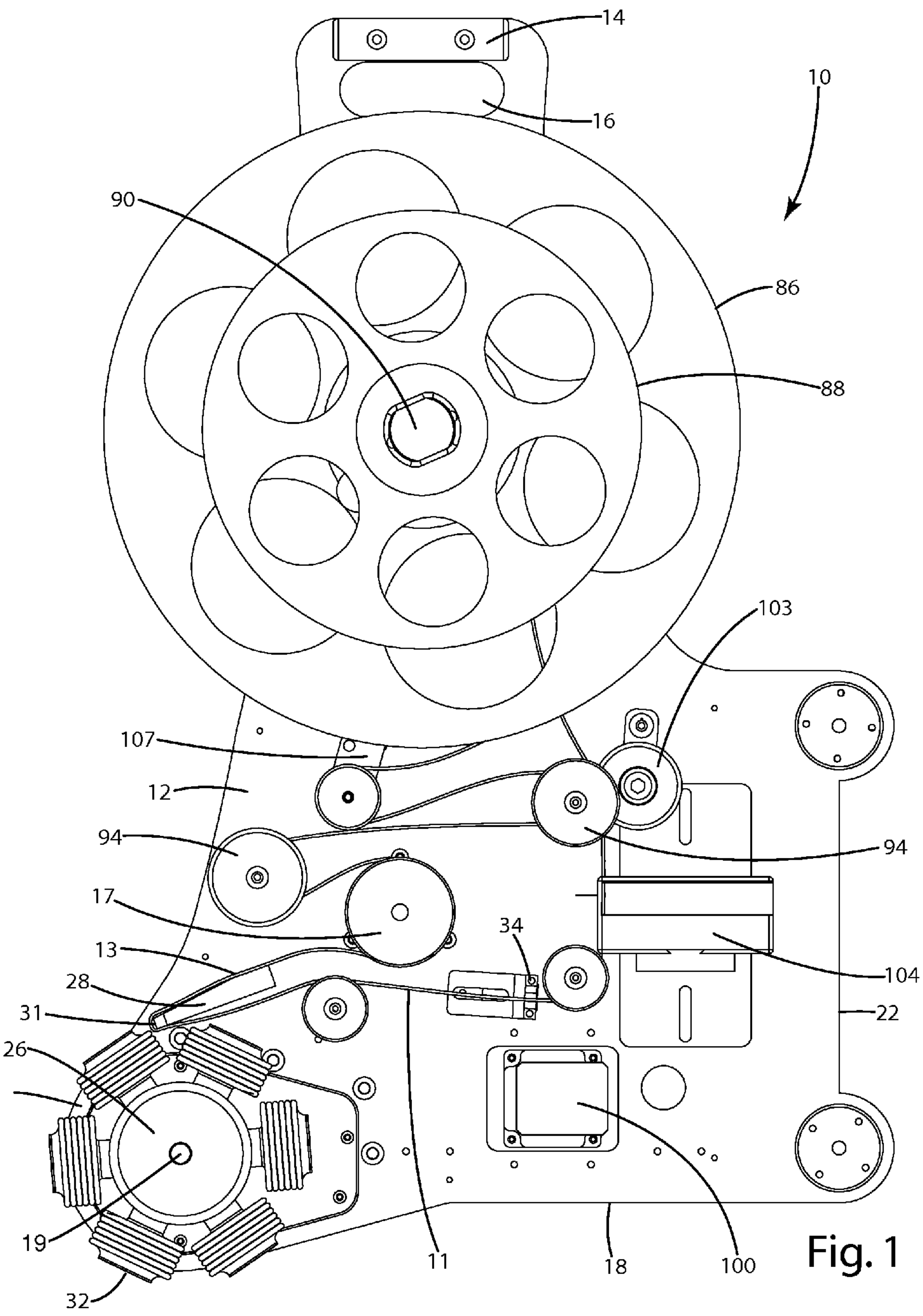
FIG. 1 is a front view of a labeller according to one embodiment of the present invention.

A labeller according to one embodiment of the present invention is shown in FIG. 1 and generally designated 10. The labeller 10 includes a frame 12 supporting a plurality of labeller components, including a label wheel 86, a peel plate 28, a drive wheel 17, a tamping bellows 30, and a waste liner rewind wheel 88. The label wheel 86 is mounted on a rotatable shaft 90 extending from the frame 12 and is capable of supporting a label web including a release liner 11 carrying a plurality of labels. The peel plate 28 is mounted to the frame 12 adjacent to the tamping bellows 30 and includes a terminal end 31, around which the label web can be drawn to separate the labels from the release liner 11. The drive wheel 17 is capable of pulling the release liner from the label wheel 86 and around the terminal end 31 of the peel plate 28. The tamping bellows 30 includes a tamping face 32 that is movable between a retracted position and an extended tamping position in which the tamping face can engage the labels as they are separated from the release liner 11. The rewind wheel 88 is rotatably mounted on the shaft 90 and is capable of supporting the release liner 11 by winding the release liner about the shaft 90.

I. Structure

The frame 12 may be configured to contain or support a variety of the labeller head and cassette components, such as the labeller components described in detail in U.S. Pat. Nos. 6,729,375; 7,153,378; 7,158,574; and 7,363,954. The labeller components may be directly or indirectly attached to the frame. Optionally, the labeller 10 can be a one-piece labeller that includes a rear frame 12 that is formed from a single piece. The frame 12 can be formed in any suitable size and shape and formed from a wide variety of materials, such as molded plastic or metal.

In the embodiment illustrated in FIGS. 1-10, the frame 12 includes a top edge 14 forming a handle 16, a bottom edge 18, a left side 20 and a right side 22. The corner formed between the bottom edge 18 and left side 20 may include a rounded extension to support a turret 26, which is adapted to support and rotate the bellows 30, as will be discussed below. The single frame 12 may also incorporate all required controls to become a "stand-alone" tamping bellows labeller, as also discussed below. The single frame 12 may also incorporate other designs or parts that form a tamping bellows labeller.

The peel plate 28 can be formed in any suitable shape and size and can include an upper surface 33 and a lower surface 35. In the illustrated embodiment, the terminal end 31 of the peel plate 28 is of a sufficient width such that the individual labels are peeled from the support wheel when they pass across the lower surface 35 and turn about the terminal end 31. The peel plate 28 is positioned adjacent the bellows 30, such that as the individual labels are peeled from the wheel, they can each be placed on the tamping face of a bellows 30.

Each bellows 30 is adapted to extend to tamp the label from the tamping face 32 of the bellows onto an object, such as an item of produce. The labeller 10 can include single or multiple, stationary or moving tamping bellows. The bellows 30 can be located above or below the peel plate 28 to receive labels as they are peeled from the release liner 11. Each bellows 30 can be formed from a flexible material, such as rubber or silicone. In the illustrated embodiment, the bellows 30 has a series of accordion-like folds, such that the bellows 30 is capable of extending outward to place the labels on the products.

Figure 12:
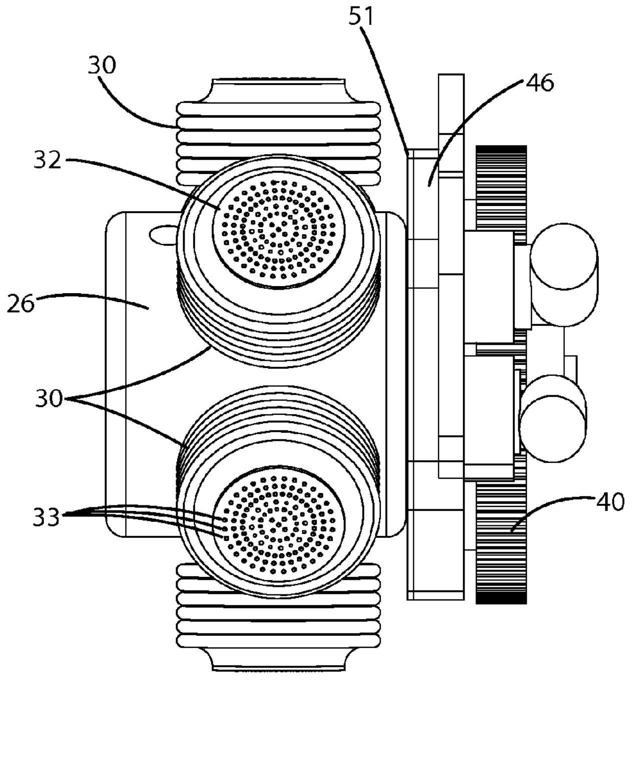
FIG. 12 is a right side view of the turret assembly.
Figure 13:
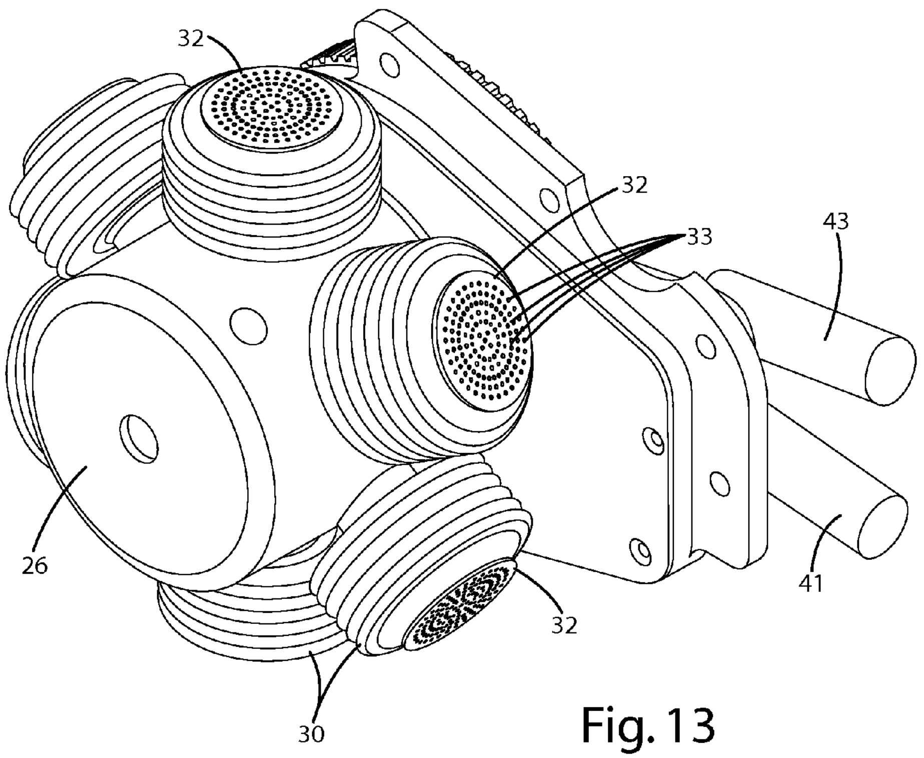
FIG. 13 is a is a front perspective view of the turret assembly.
Figure 35:
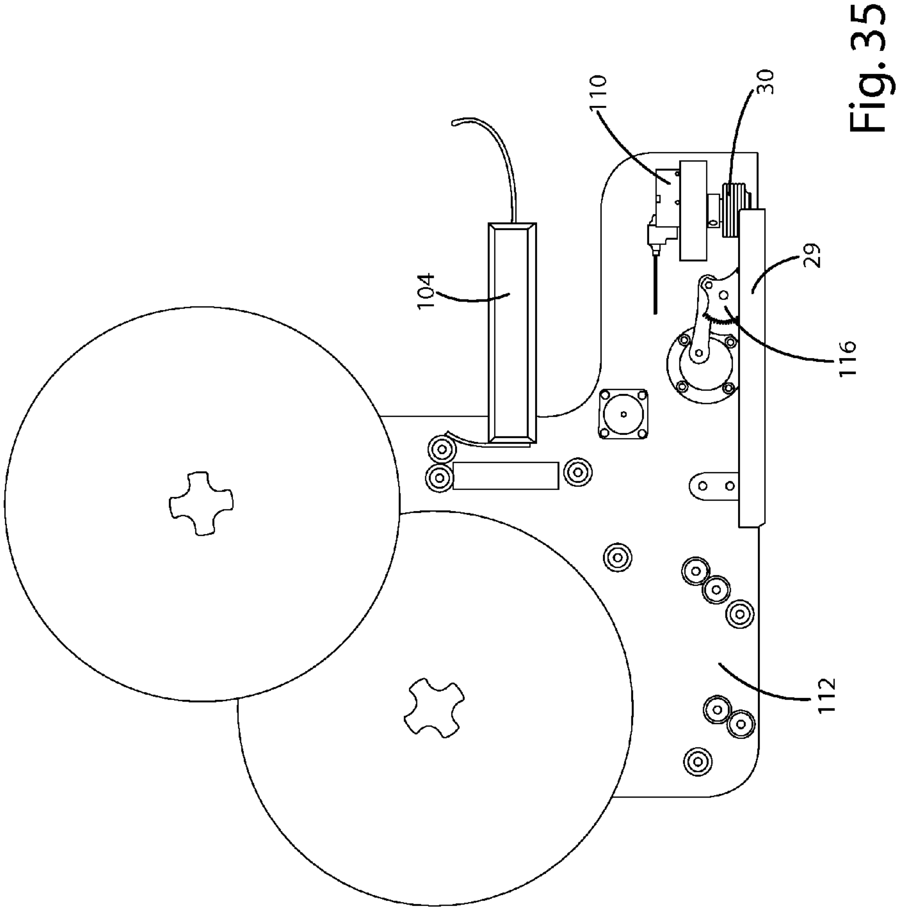
FIG. 35 is a front view of labeller according to a third embodiment of the present invention.
Figure 37:
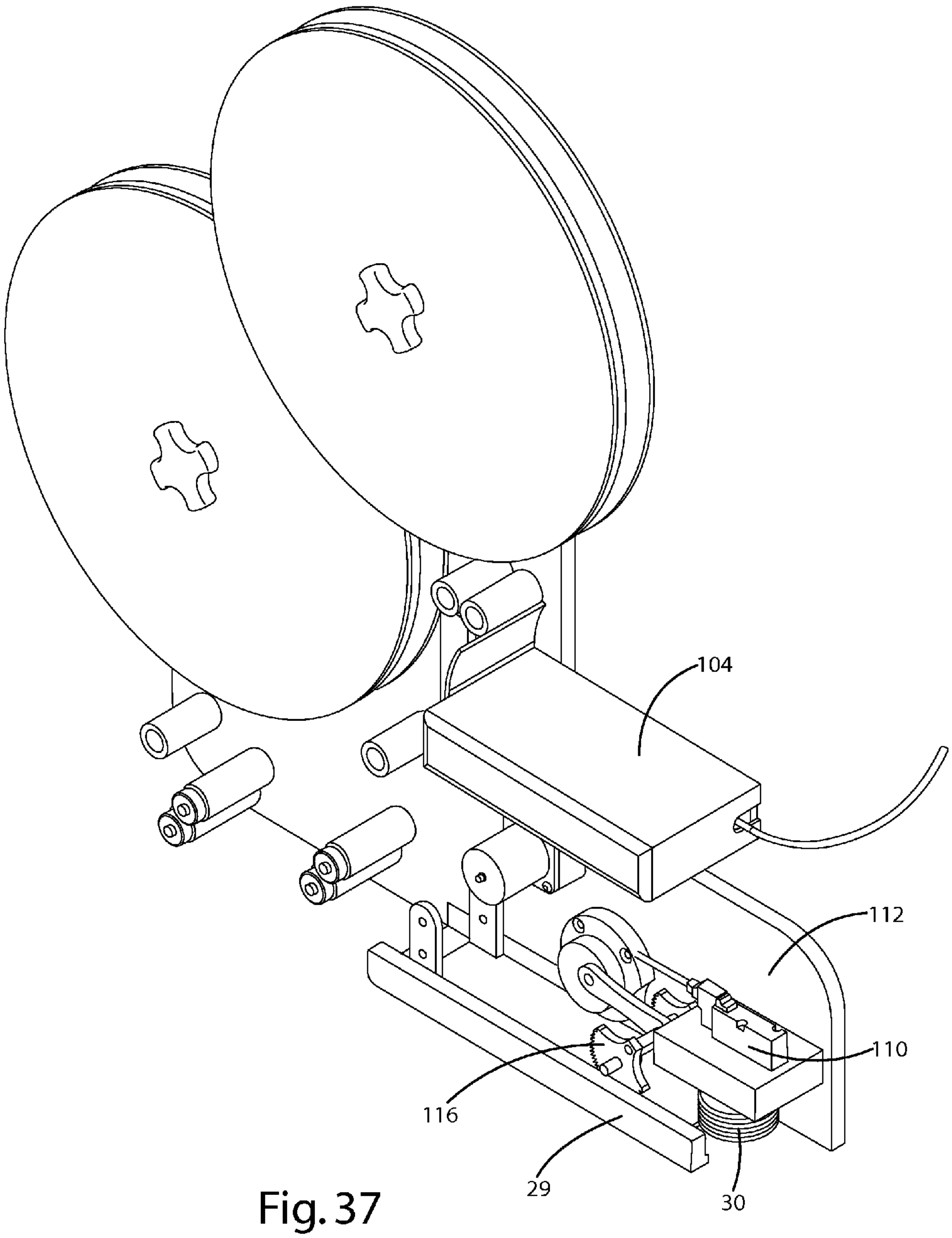
FIG. 37 is a front perspective view thereof.
Figure 38:
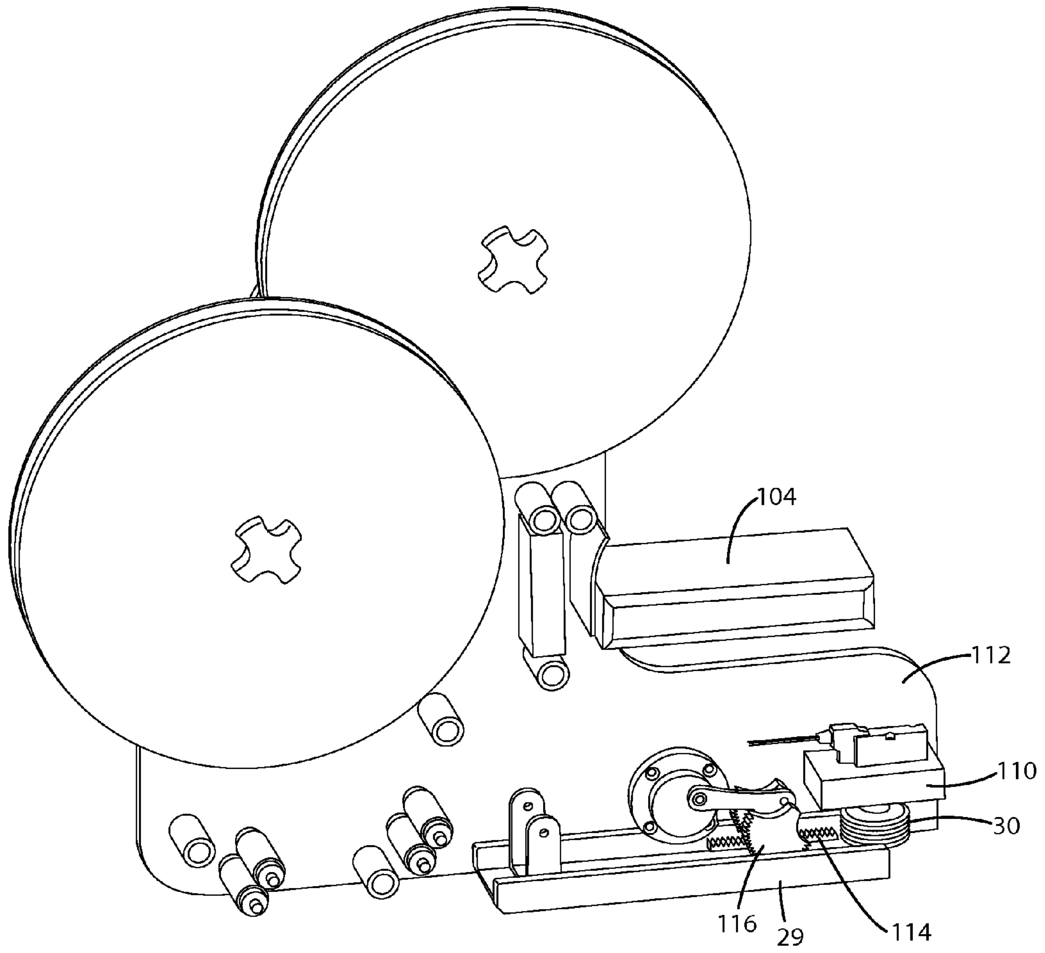
FIG. 38 is a front line drawing thereof.
Figure 39:
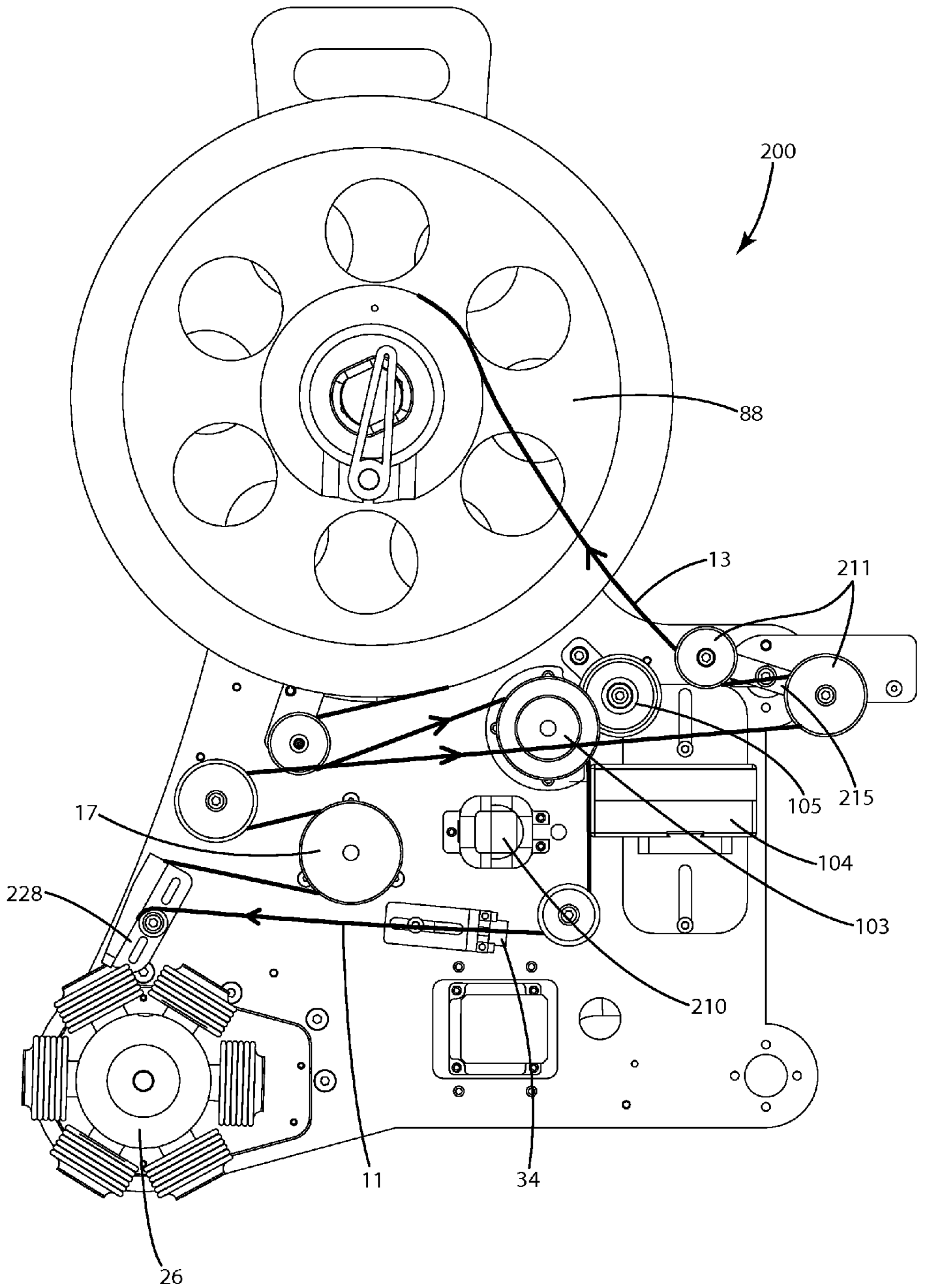
FIG. 39 is a front view of a labeller according to a fourth embodiment of the present invention.
Figure 40:
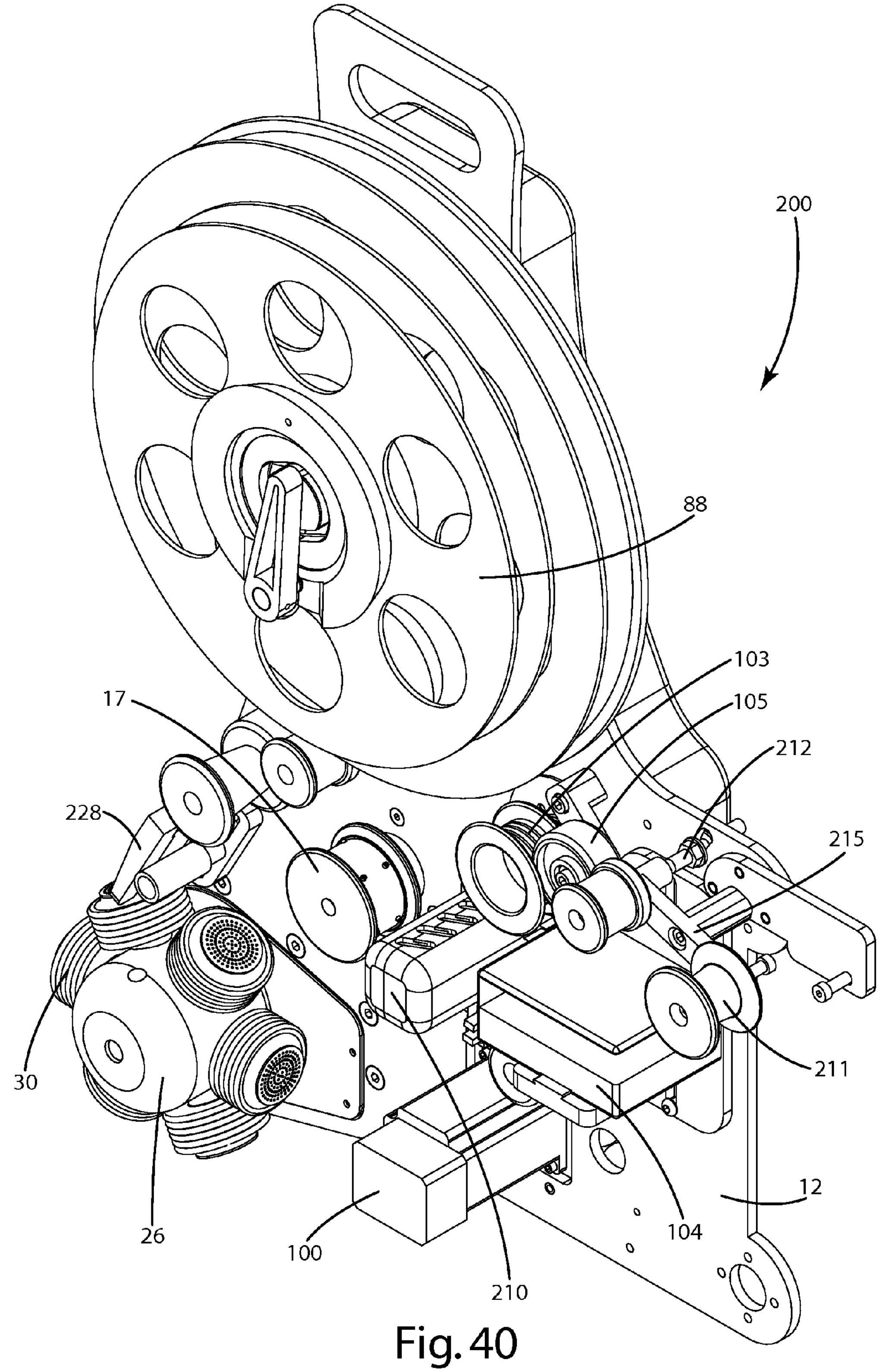
FIG. 40 is a front perspective view thereof.
Figure 41:
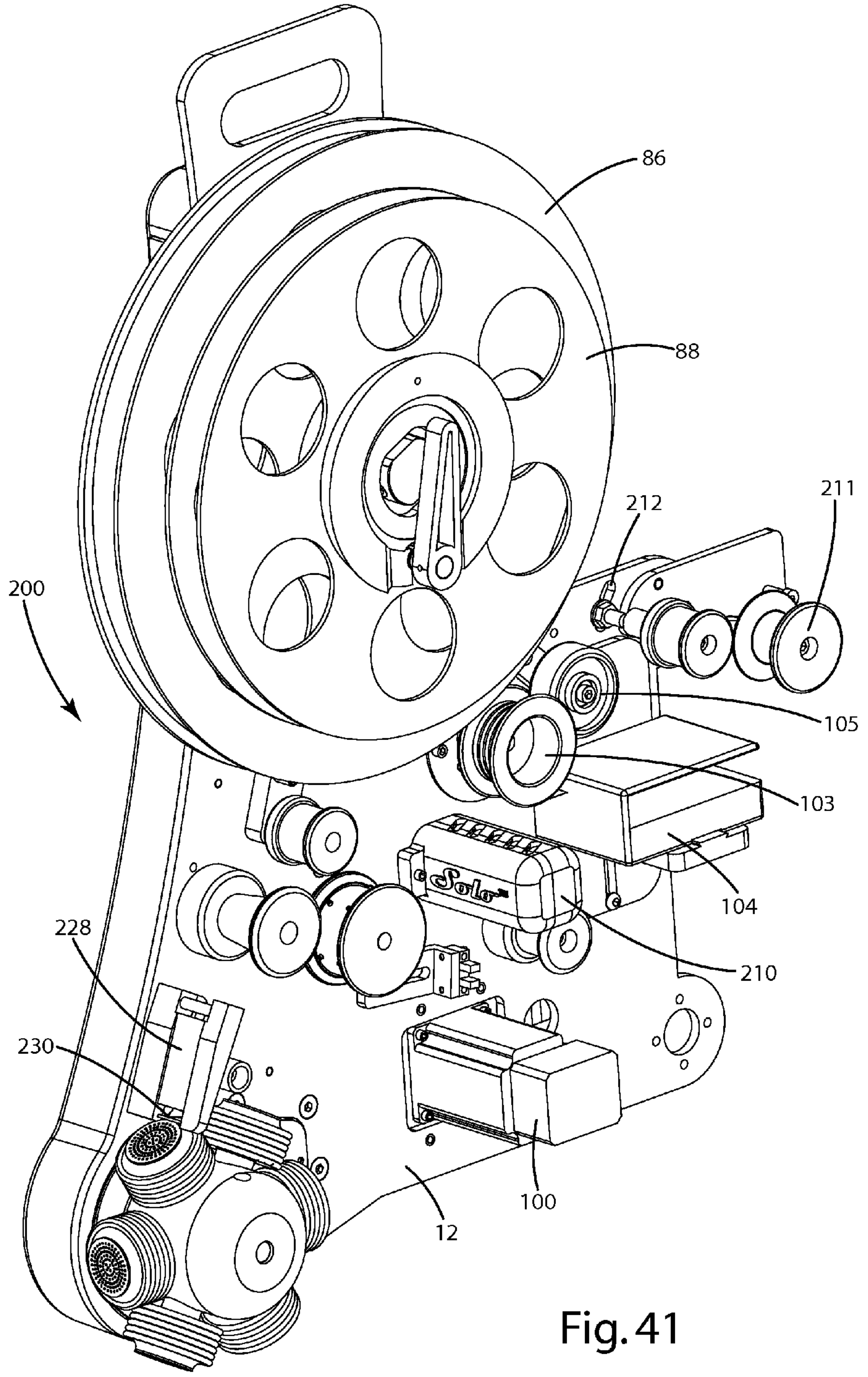
FIG. 41 is another front perspective view thereof.
Figure 42:
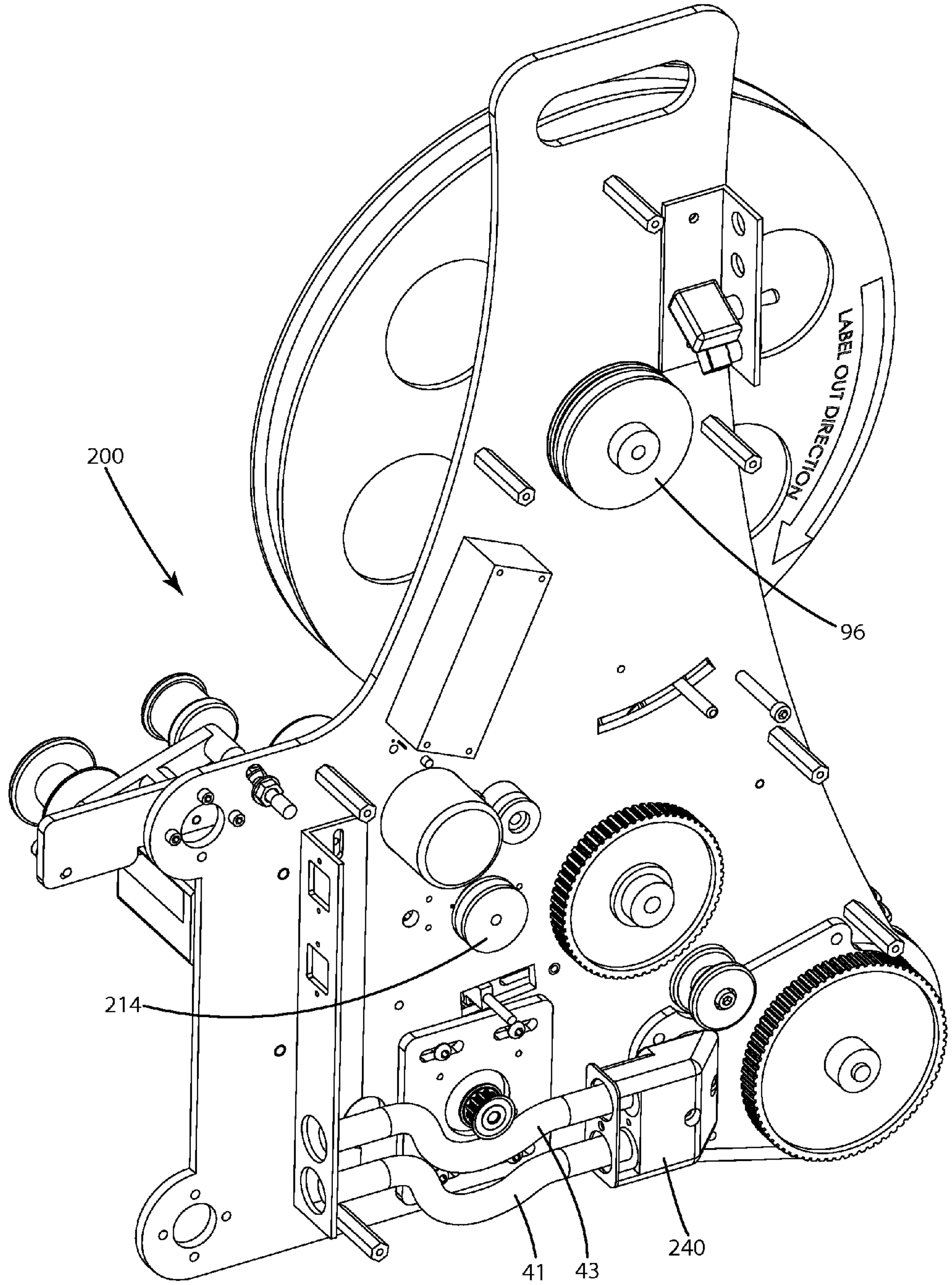
FIG. 42 is a rear perspective view thereof.
Figure 43:
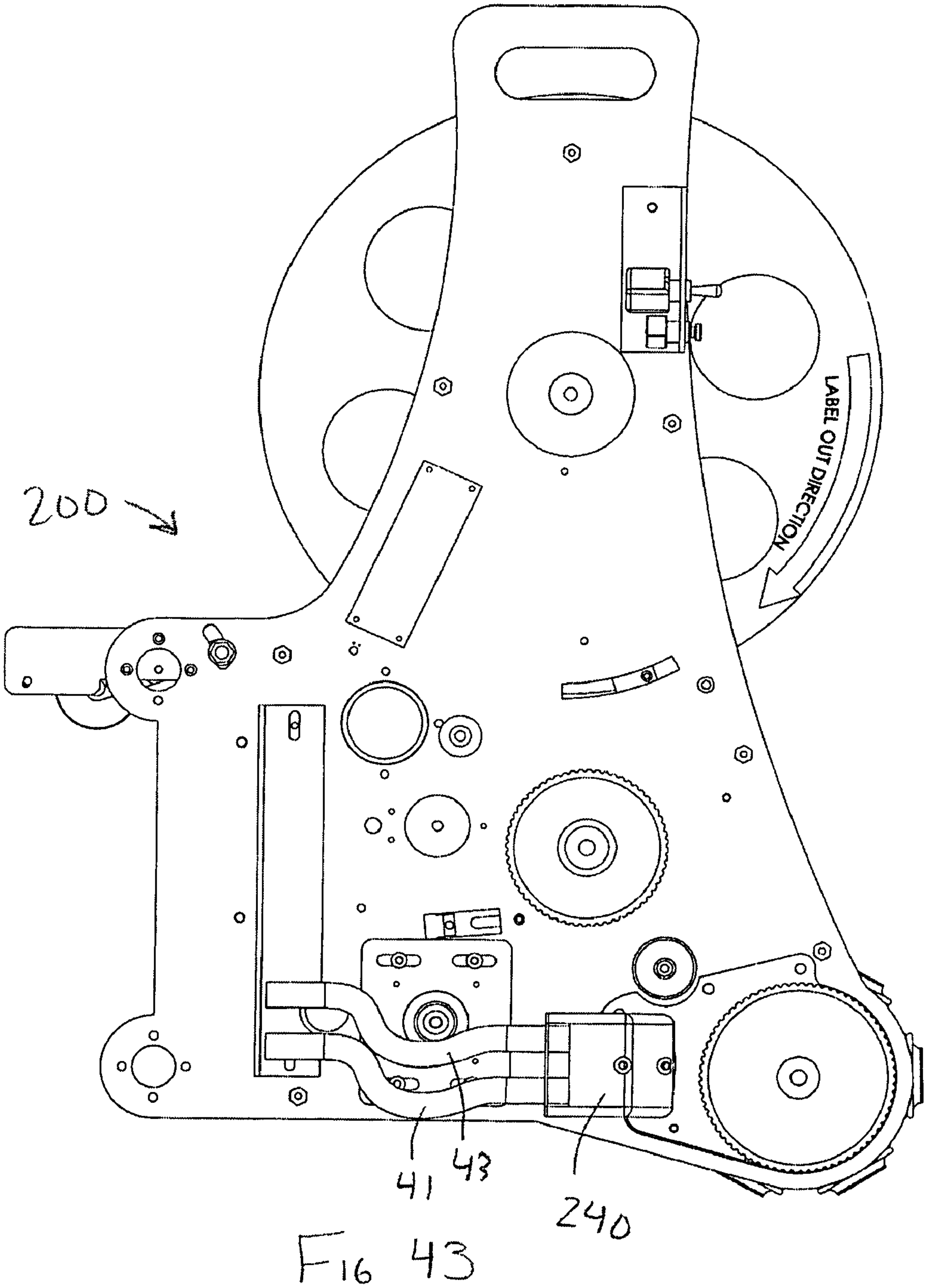
FIG. 43 is a rear view thereof.

The tamping face 32 of each bellows 30 is perforated with holes 33. In one embodiment, the label is held on the tamping face 32 via vacuum pressure communicated through the vacuum holes 33 (FIGS. 12-13). The label can be deposited on the item by switching off the vacuum source 43 when the bellows 30 is in an extended position. The bellows 30 may be extended into the extended position by a positive pressure source 41 provided in the bellows 30. In one embodiment, both the vacuum and pressure supplies 43 and 41 can be provided by an electric and/or pneumatic valve, such as the pneumatic valve 110 shown in FIG. 35, which may be mounted to the frame 12. However, any other suitable means for providing a vacuum source or a positive pressure source can be used.

Figure 14:
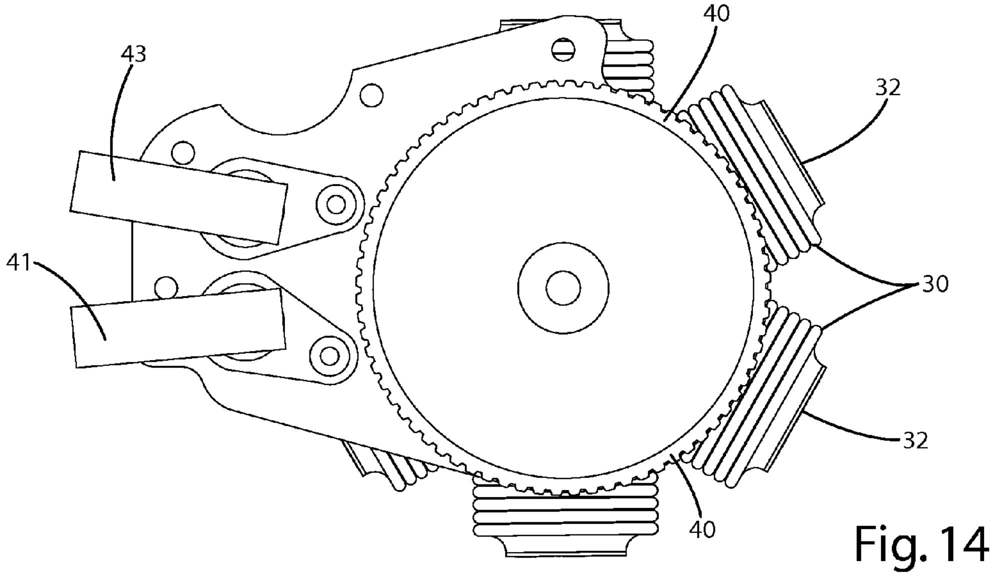
FIG. 14 is a rear view of the turret assembly.
Figure 15:
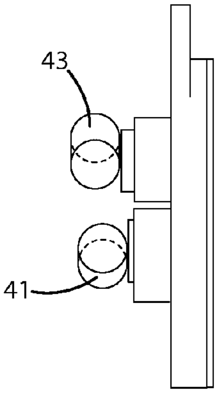
FIG. 15 is a right side view of the port assembly.
Figure 16:
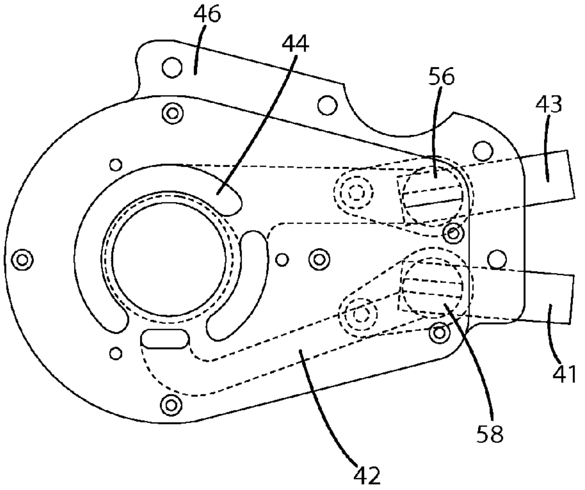
FIG. 16 is a front view of the port assembly.
Figure 17:
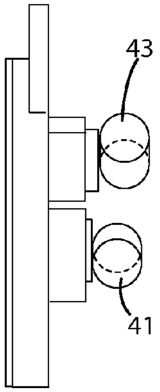
FIG. 17 is a left side view of the port assembly.
Figure 18:
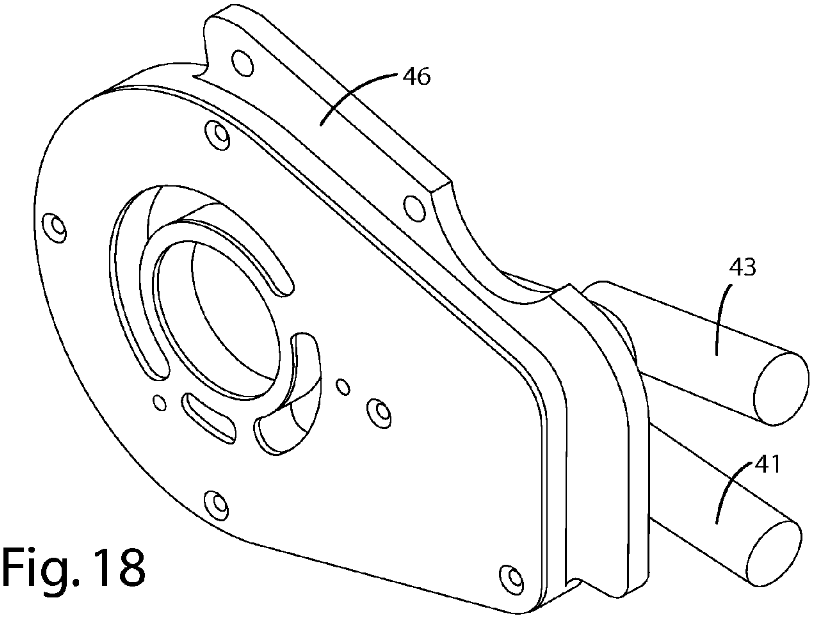
FIG. 18 is a front perspective view of the port assembly.
Figure 21:
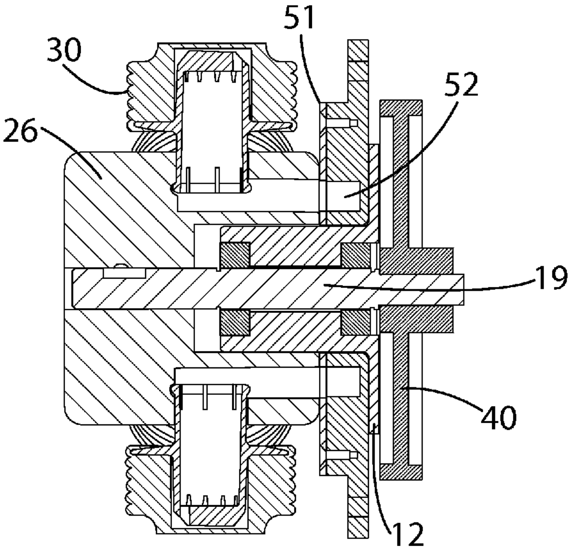
FIG. 21 is a cross-sectional view of the turret along line A-A in FIG. 20.
Figure 22:
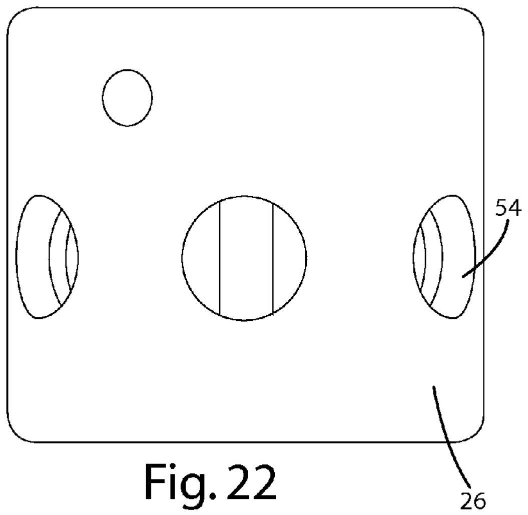
FIG. 22 is a top view of a turret.
Figure 24:
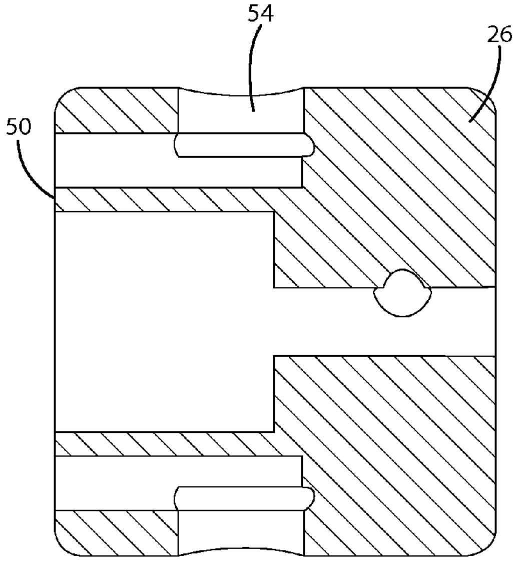
FIG. 24 is a cross-sectional view of a turret taken along line A-A in FIG. 23.
Figure 23:
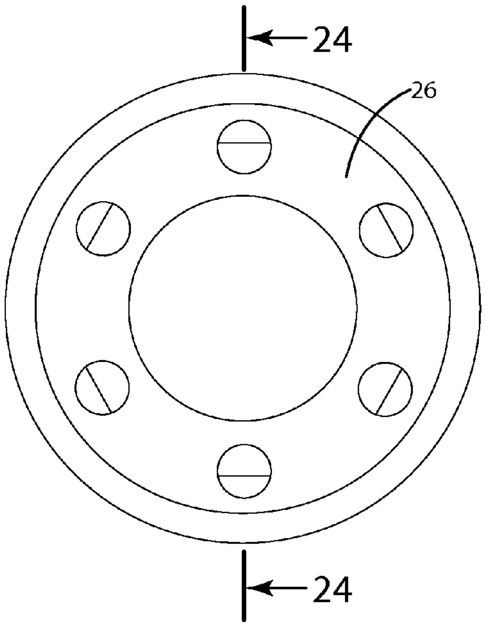
FIG. 23 is rear view of a turret.
Figure 25:
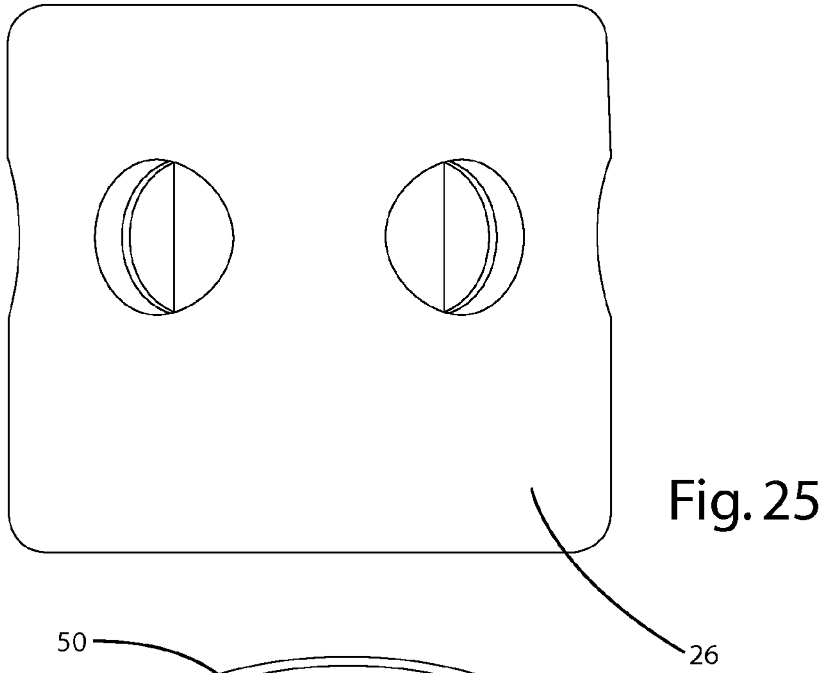
FIG. 25 is a bottom view of the turret.
Figure 26:
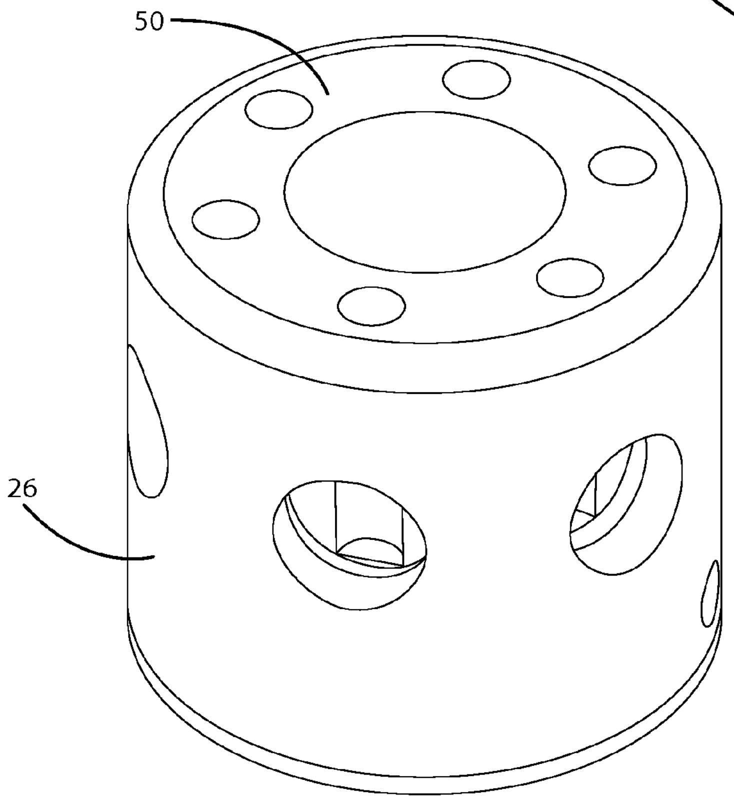
FIG. 26 is a perspective view of the turret.
Figure 32:
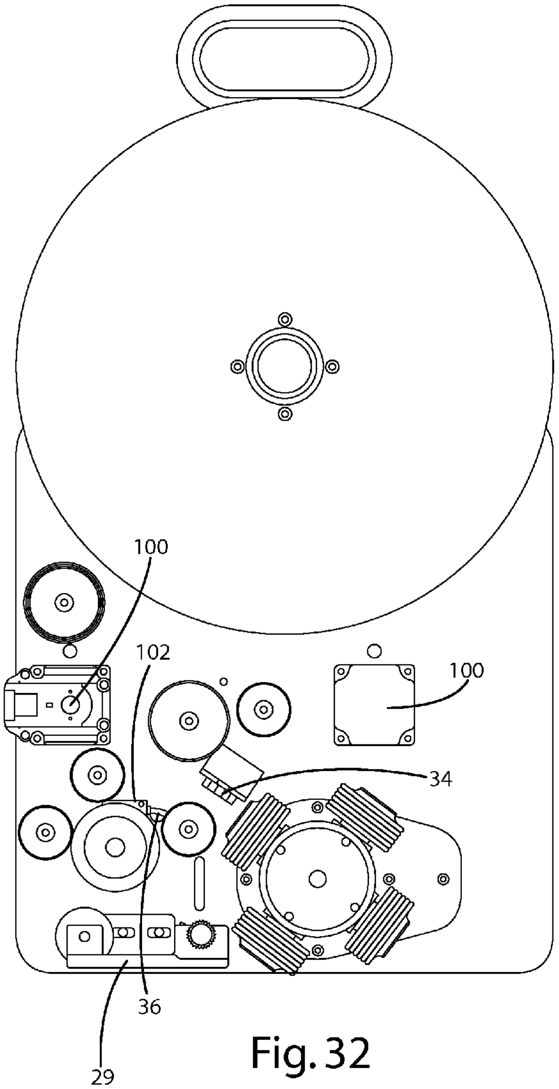
FIG. 32 is a front view of a labeller according to a second embodiment of the present invention.
Figure 33:
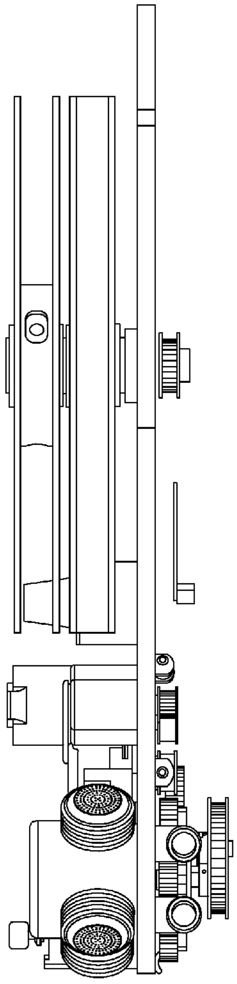
FIG. 33 is a right side view thereof.
Figure 34:
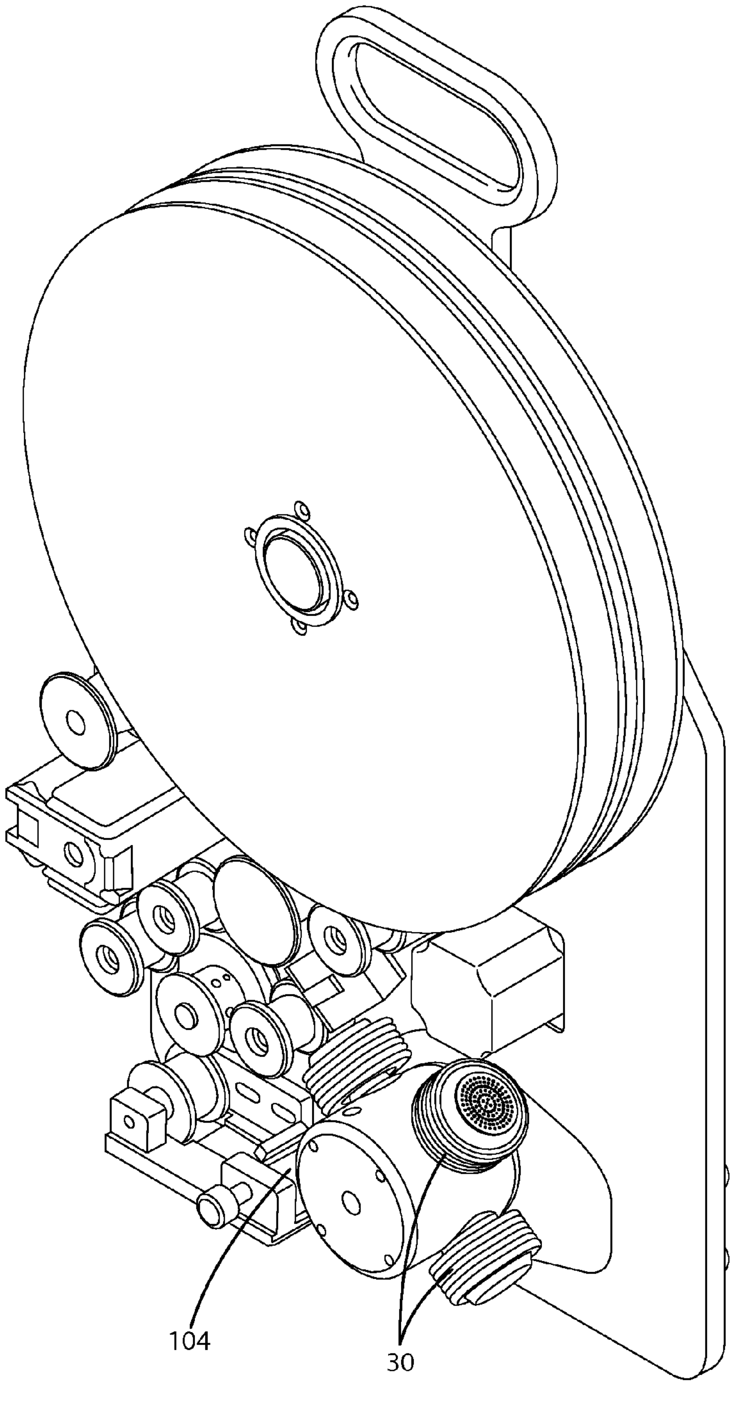
FIG. 34 is a front perspective view thereof.
Figure 36:
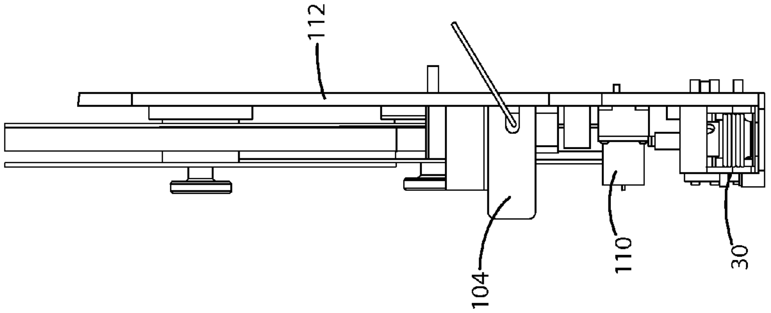
FIG. 36 is a right side view thereof.

In the illustrated embodiment, the multiple bellows 30 are mounted to a rotating turret 26. FIGS. 1-10 show an embodiment with a rotating turret 26 positioned below the peel plate 28. As shown in FIGS. 32-34, in another embodiment, the rotating turret 26 can alternatively be positioned above the peel plate 29. FIGS. 11-26 show a turret 26 and axle or shaft 19. As shown, the axle is a rotating shaft 19 mounted to the frame 12. In the illustrated embodiment, the shaft 19 extends through the frame 12 and supports a gear 40 on the opposite side of the frame 12 as the turret 26 (FIGS. 14 and 21). The gear 40 may be driven by a variety of means to rotate the turret 26, such as a belt drive (not shown). In one embodiment, the gear 40 is driven by a belt that also drives other labeller components. In another embodiment, the gear 40 is driven by a dedicated belt drive, or another type of drive.

Figure 19:
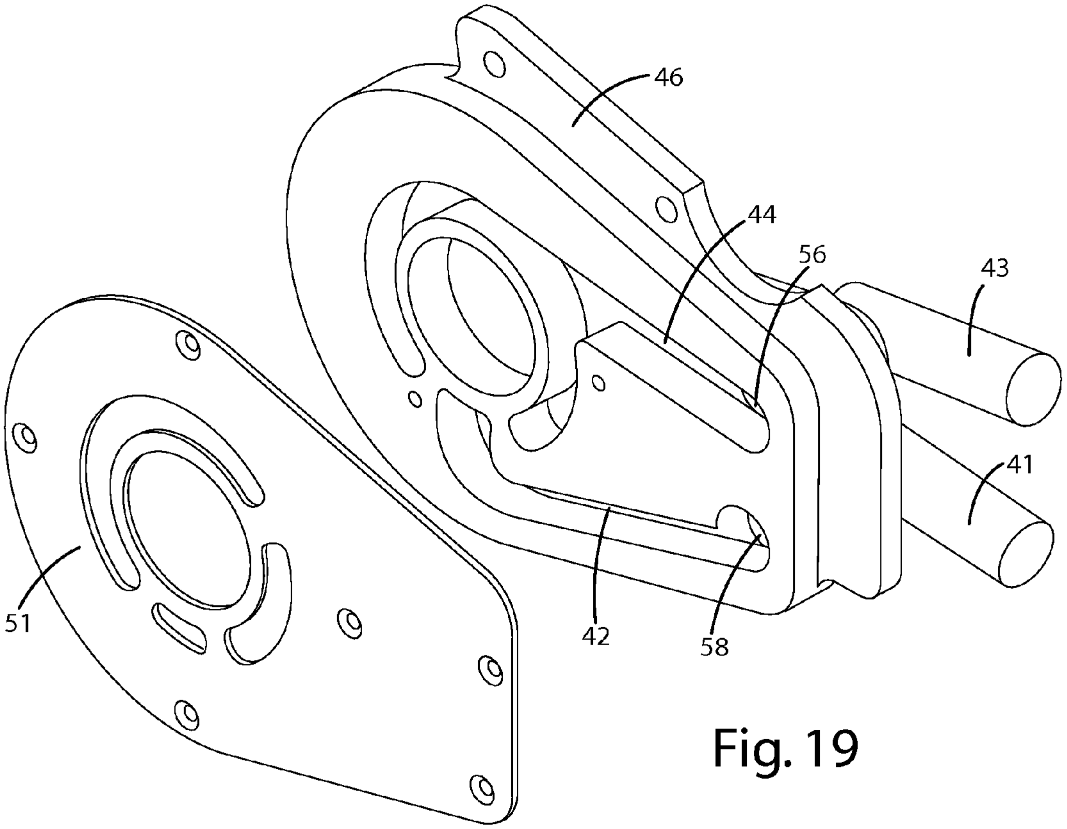
FIG. 19 is an exploded view of the port assembly.
Figure 20:
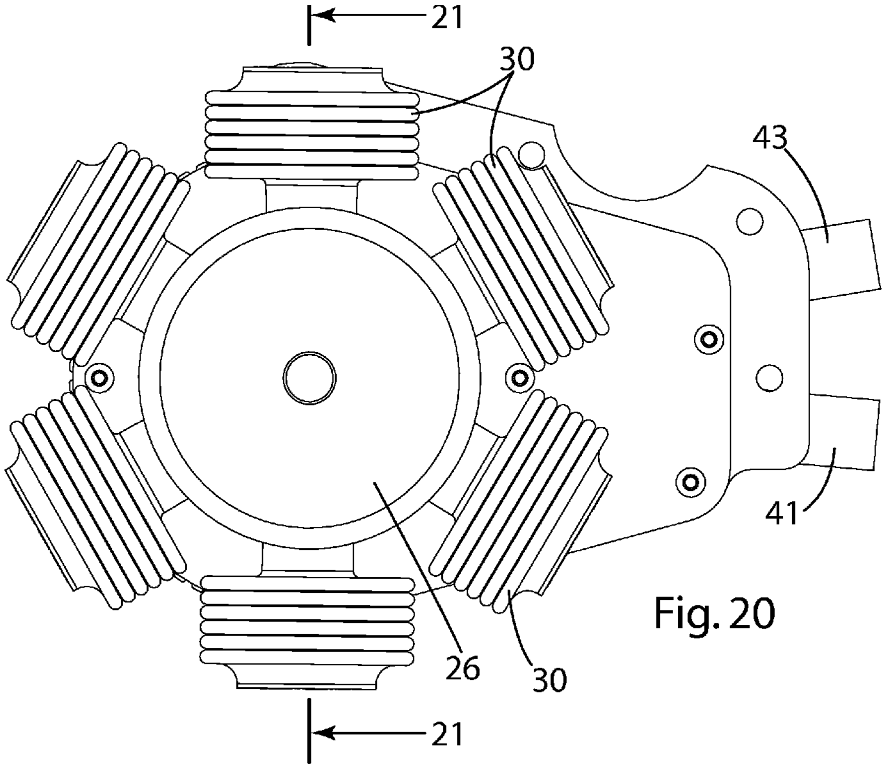
FIG. 20 is a front view of the turret assembly.

As shown in FIG. 19, air pressure 42 and vacuum 44 ports are mounted to and/or moulded into a plate 46 that is formed as part of the main frame 12 or attached to the main frame 12 as a separate piece. In the illustrated embodiment, pressure 42 and vacuum 44 port holes are located on a porting surface 51 of the plate 46 such that they are adjacent to the side of the turret 26. As shown in FIGS. 22-26, the turret 26 includes an inner surface 50 facing the porting surface 51. The inner surface 50 defines a plurality of port holes 52, with one port hole 52 for each bellows 30 attached to the turret 26. Each port hole 52 extends through the turret 26 forming an air passage to an exit hole 54 on the circumferential face of the turret 26. Each bellows 30 is attached over top of one of the exit holes 54. As shown in FIG. 19, the vacuum port 44 extends from an intake 56 to form a horseshoe shape around substantially all of the axle hole. The pressure port 42 extends from an intake 58 to a position adjacent the axle hole within the gap formed by the vacuum port 44.

In one embodiment, the turret 26 rotates on the axle and against the porting surface 51, which may be a low friction material (i.e. stainless steel) or low-friction coated metal or plastic or a mechanical bearing (i.e. lazy Susan). As the turret 26 rotates, the port holes 52 are in fluid communication with the vacuum port 44 and the pressure port 42. More particularly, in the illustrated embodiment, the port holes 52 are generally in fluid communication with the horseshoe shaped vacuum port 44, such that the bellows 30 and tamping face are in fluid communication with the vacuum to hold the bellows in a retracted position and to hold a label on the tamping face. When the bellows 30 pass the pressure port 44, however, the port holes 52 and bellows 30 are in fluid communication with the positive pressure to extend the bellows and release the label.

The peel plate 28 (or 29) can be formed in any suitable shape and size. In the illustrated embodiment, the peel plate is generally square in shape, with the release liner traveling lengthwise across the plate 28 (FIG. 1). The release liner 11 is wrapped around the peel plate 28, such that when the release liner 11 reaches the end of the peel plate 28, the label peels off of the release liner 11. One of the bellows 30 that is positioned adjacent the peel plate can then grab the label as it is peeled from the release liner 11. Optionally, the peel plate 28 (or 29) may be adapted to move in and out or up and down or sideways to release labels from the liner to be picked up by the bellows 30. For example, in the embodiment shown in FIGS. 35-38, the peel plate 29 is movable forward and backward with respect to the frame 112 as a result of a rack 114 and pinion 116 arrangement mounted on the frame 112.

The label position on the bellows 30 may be determined by a combination of one or more sensors to detect label position and/or the position of the waste liner drive roller pins. For example, the label position on the bellows 30 may be determined by a label sensor 34 (FIG. 32). The label position on the bellows 30 may also be determined by a sensor 36 that detects the position of the waste liner drive roller pins. The sensors 34 and 36 may be a combination of one or more photo optic, laser, inductive, capacitive, or other electrical/electronic sensors.

The label position on the bellow 30 may be additionally or alternatively be determined by a toothed belt or gear, or multiple belts or gears, that mechanically synchronize the label and bellow positions. For example, the label position on the bellows 30 may be determined by electrically or mechanically synchronizing two or more drives that separately drive the label feed and/or rewind and/or turret 26 and/or print mechanism (discussed below).

In one embodiment, the labeller 10 includes a printing mechanism 104 adapted to print a desired printed material on the labels before they are placed onto objects. The printing mechanism 104 can be mounted on the frame 12 at one or more label positions prior to the peel plate dispensing edge to print real-time, variable, or the same product information and/or identification. For instance, in the embodiment illustrated in FIGS. 1-10, the print mechanism 104 is mounted to the frame 12 along the label path such that it is spaced from the peel plate, to enable printing on labels that are a few labels away from the peel plate. Alternatively, as shown in the FIG. 32-34 embodiment, the print mechanism 104 is positioned in the label path adjacent to the peel plate 29, to enable printing on the label that will next be picked up by a tamping bellows 30. The print mechanism may be one of a variety of print technologies, including ink-jet, direct thermal, thermal transfer, laser, ultra-violet or special light reactive. In one embodiment, the printing mechanism 104 may be moveable along the label path in one or more directions, for instance, to enable printing the printed information on the label while the label is not in motion.

Figure 2:
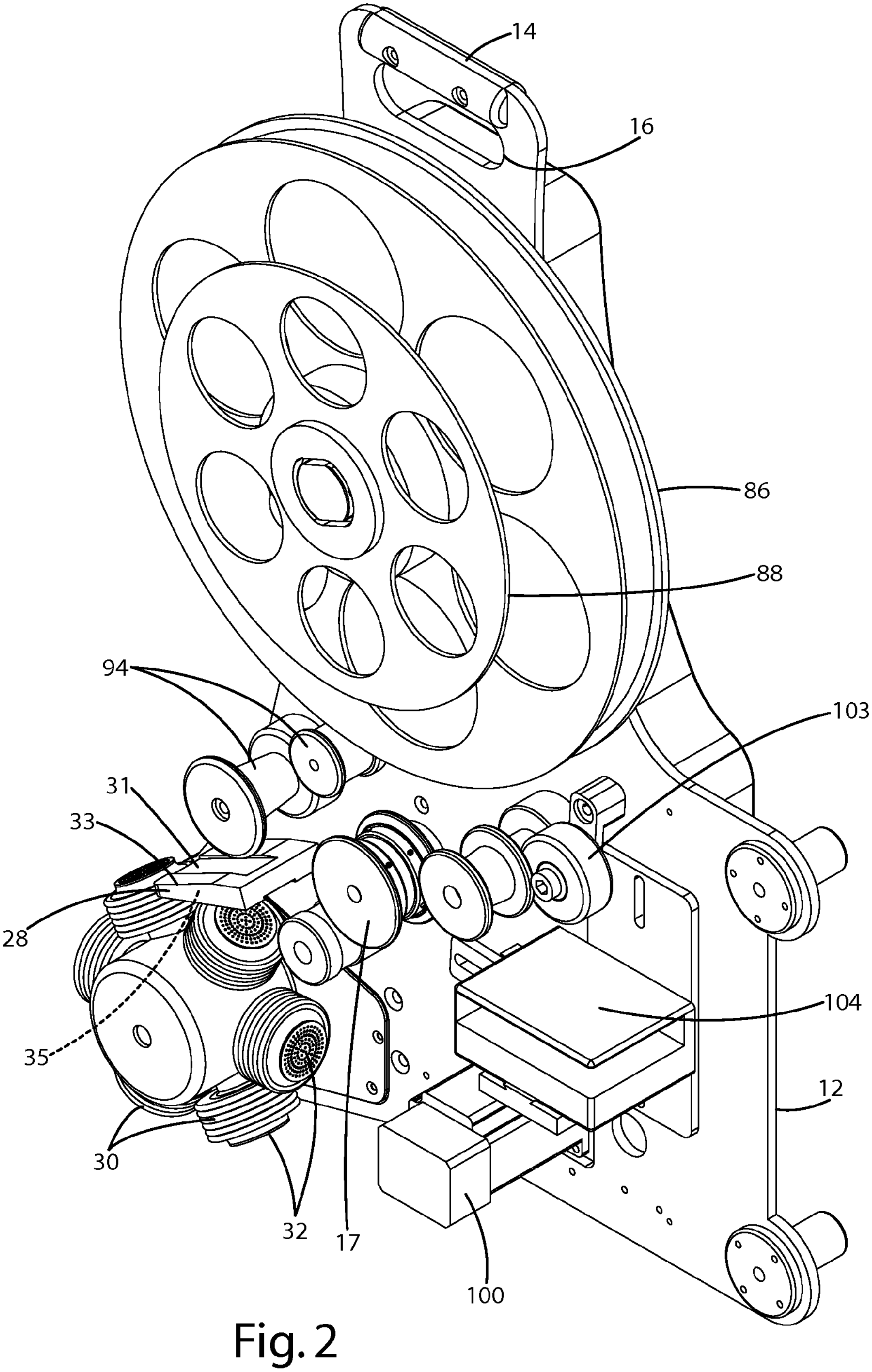
FIG. 2 is a perspective view of the labeller.
Figure 3:
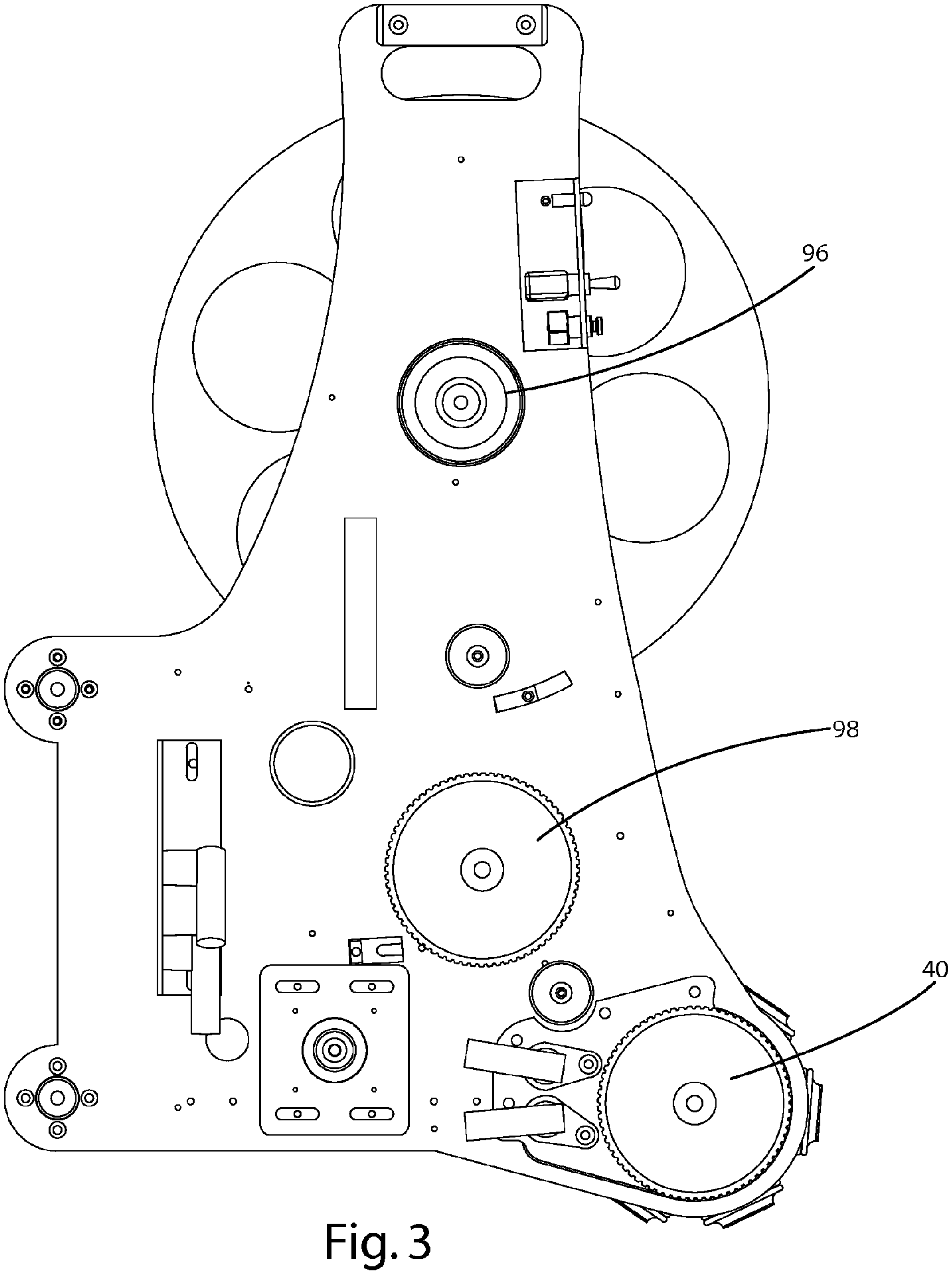
FIG. 3 is a rear view of the labeller.
Figure 4:
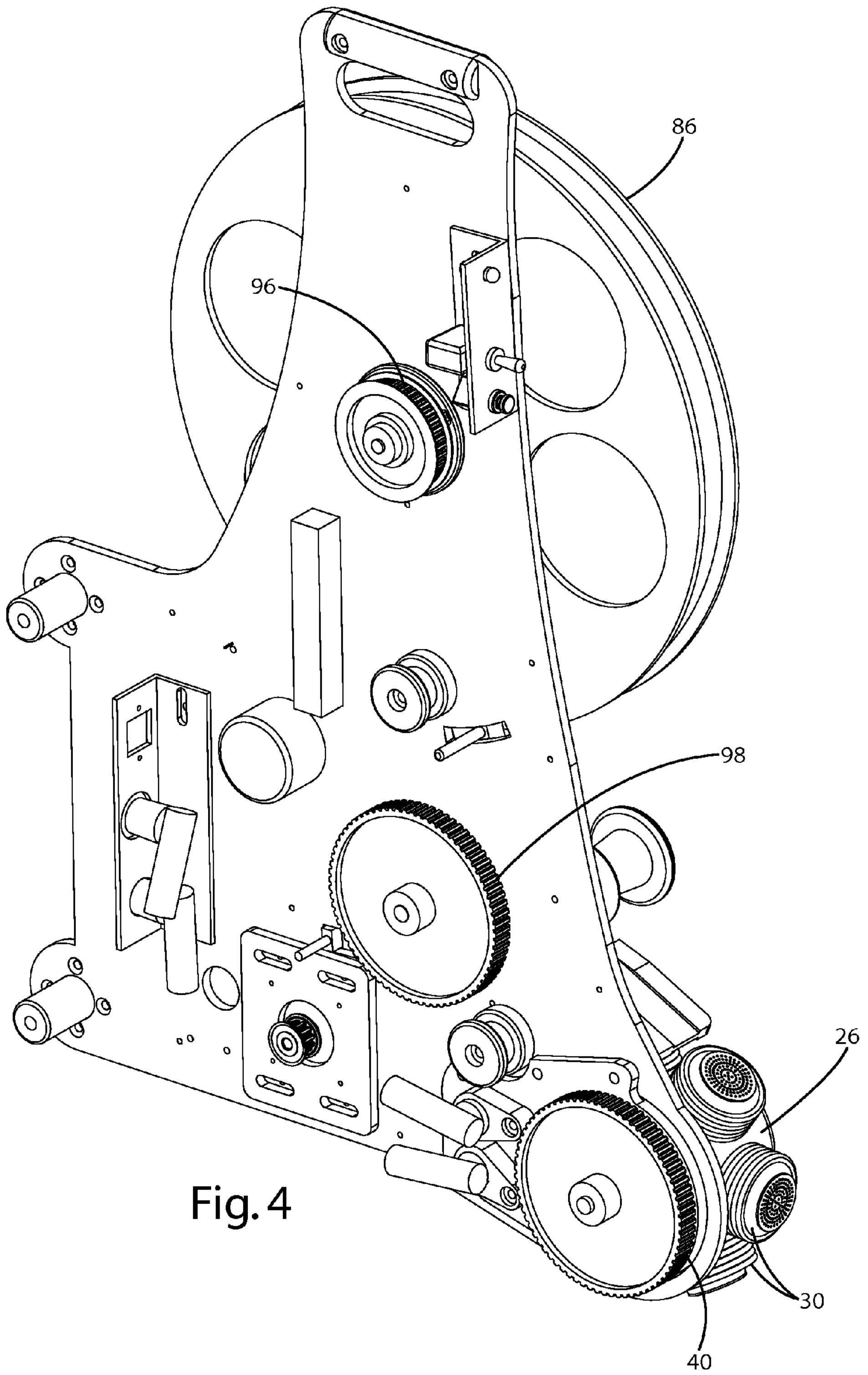
FIG. 4 is a rear perspective view of the labeller with the rear cover removed.
Figure 5:
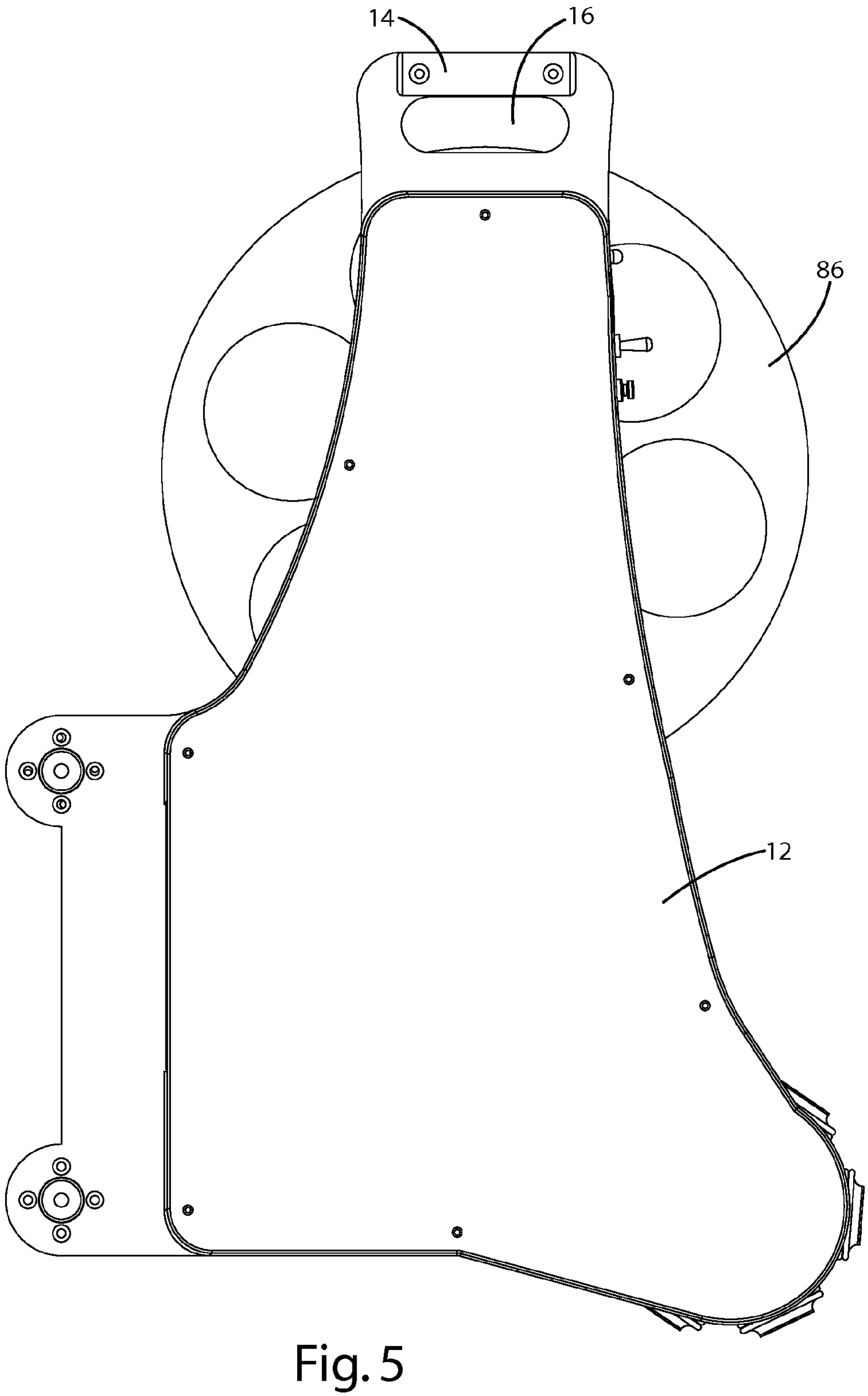
FIG. 5 is a rear view of the labeller.
Figure 6:
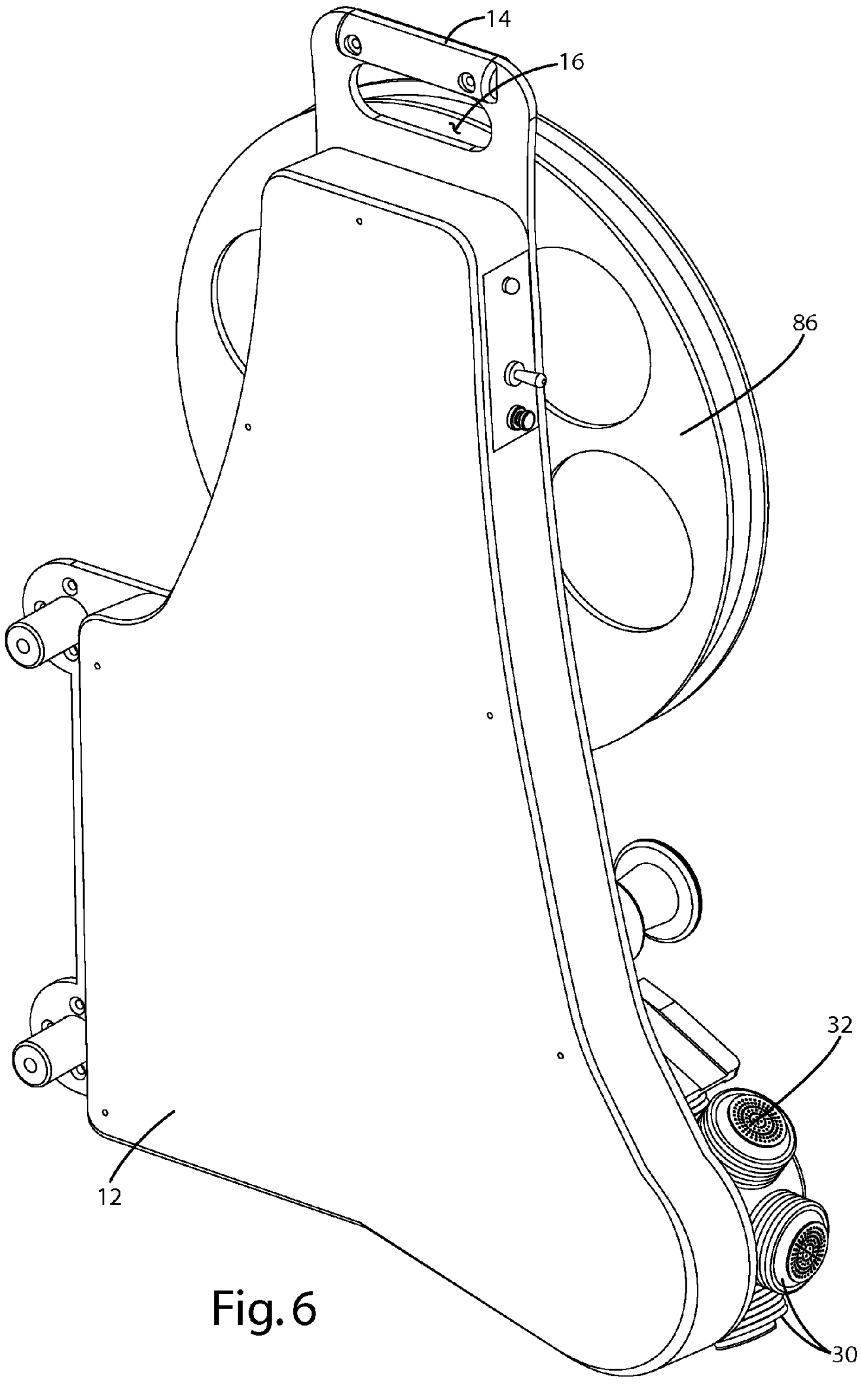
FIG. 6 is a rear perspective view of the labeller.
Figure 7:
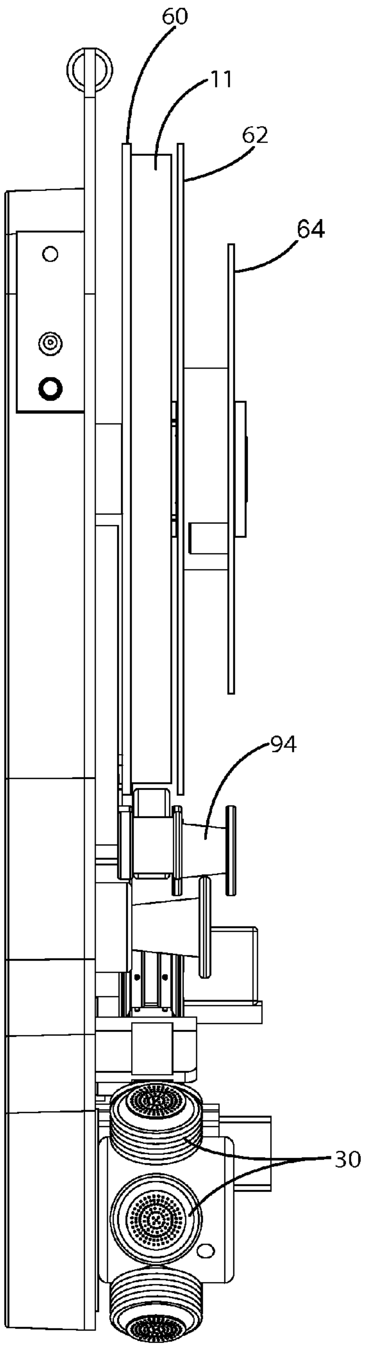
FIG. 7 is a left side view of the labeller.
Figure 8:
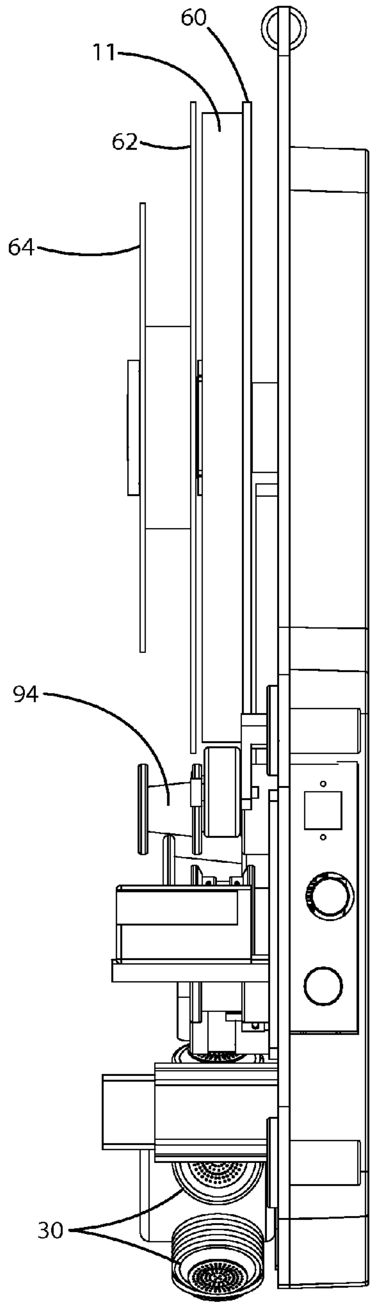
FIG. 8 is a right side view of the labeller.
Figure 9:
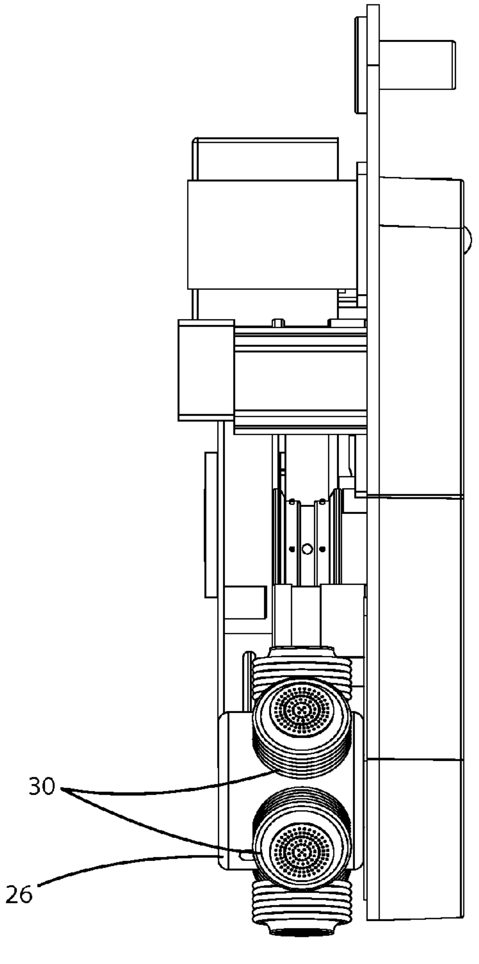
FIG. 9 is a bottom view of the labeller.
Figure 10:
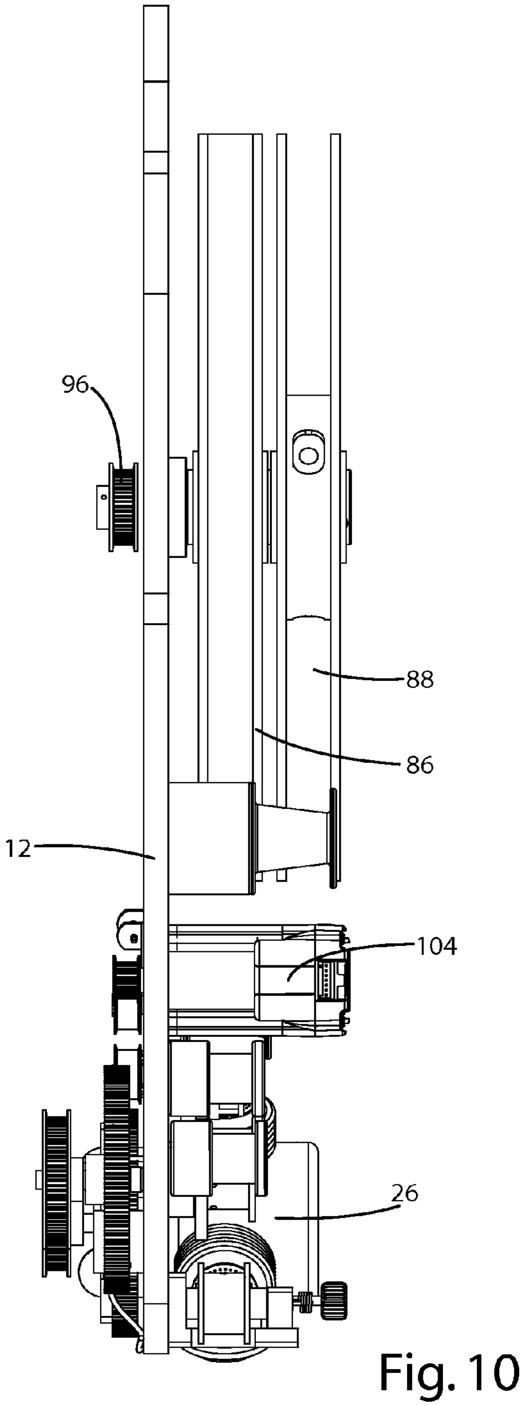
FIG. 10 is a top view of the labeller.
Figure 11:
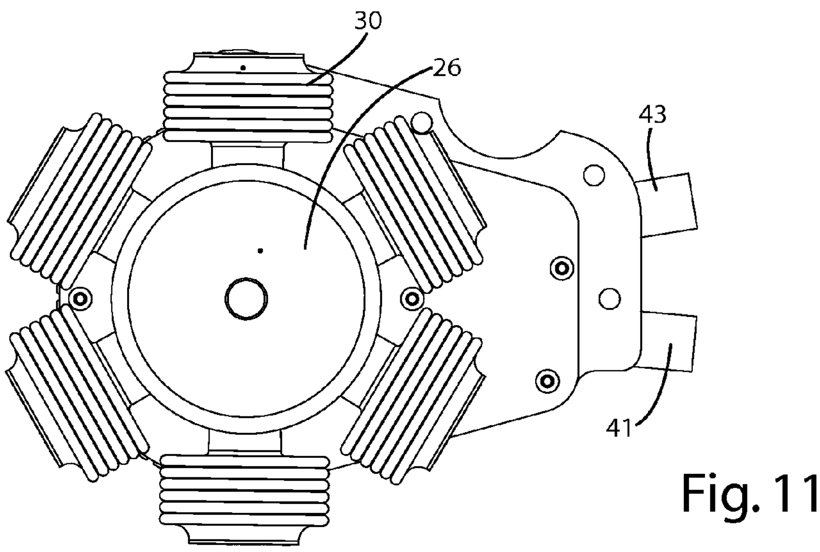
FIG. 11 is a front view of the turret assembly.

In the embodiment illustrated in FIGS. 1-10, the label web 11 is routed from the label wheel 86 around a label pinch roller 103, shown in FIG. 2, which holds the label web 11 firmly on in place on the roller 103. This prevents the liner from moving and/or stretching as the liner tension swing arm 107, which adjusts and maintains label web tension, and can cause the roll to stop abruptly, and controls the position of the printed image (known as "print registration") on the label web 11. An electronic positioning device, such as a rotary encoder 105 (FIG. 2), may be attached to an idler roller that is located before or after the print mechanism to precisely control the angle of rotation of the idler roller in order to properly register a label for printing.

In one embodiment, the print mechanism 104 is electrically coupled to a system controller (not shown) and a user input interface (not shown). The controller may be programmed to allow a user to input a desired print type and control the print mechanism to output labels with that print type. The print mechanism and/or controller may incorporate software or hardware speed and/or position sensing device to signal and control the printer to print the information while matching the label dispensing speed to maintain accurate print location on the labels. In one embodiment, the encoder 103 may be electrically connected to the controller to control the print mechanism and/or signal the software to improve the print registration and/or print image quality (i.e. contrast, darkness, dpi).

In the illustrated embodiment, the label wheel 86 and rewind wheel 88 are formed as a multi-disc assembly that supports both the pre-loaded label roll and waste liner together on the rotating rewind shaft 90. For example, FIGS. 27-31 show a rewind assembly 61 that includes a first disc 60 adjacent to the frame 12, a second disc 62, and a third disc 64. The label web or roll can be supported between the first 60 and second 62 discs, such that the roll rotates about a label hub 66 that engages and rotates with the shaft. The waste liner 13, which remains on the labeller 10 after the labels have been removed and applied to products, may be wound onto the rewind hub 92 between the second 62 and third 64 discs.

In this embodiment, both the label web and the waste liner 13 are wound around the same axis, which would typically rotate both the label wheel 86 and the rewind wheel 88 at the same speed. However, the radius of the label web is typically larger than that of the waste liner on the rewind wheel, because as the labeller 10 begins to operate, the rewind hub 92 is empty and only accumulates waste liner as the labels are pulled from the liner 11. Thus, to account for the fact that the distance that the label rewind hub 92 must rotate to wind a particular amount of waste liner 13 decreases as the diameter of the waste liner 13 increases, the labeller 10 can include a mechanism, such as gripping mechanism 63, which is incorporated in the rewind disc assembly 61 to alter the speed of the rewind wheel with respect to the shaft 90. The gripping mechanism 63 holds the rewind disc assembly 61 on the rotating rewind shaft 90 during the rewind operation to provide a mechanical "slipping" action as the rotating rewind shaft 90 is rotated faster than the rewind disc assembly, in order to rewind and maintain tension on the waste liner. As shown, the label rewind assembly includes a label rewind core 70 that mounts directly onto the shaft and rotates at the same rate of the shaft, and a rewind hub 72 that rotates about the label rewind core 70.

Figure 27:
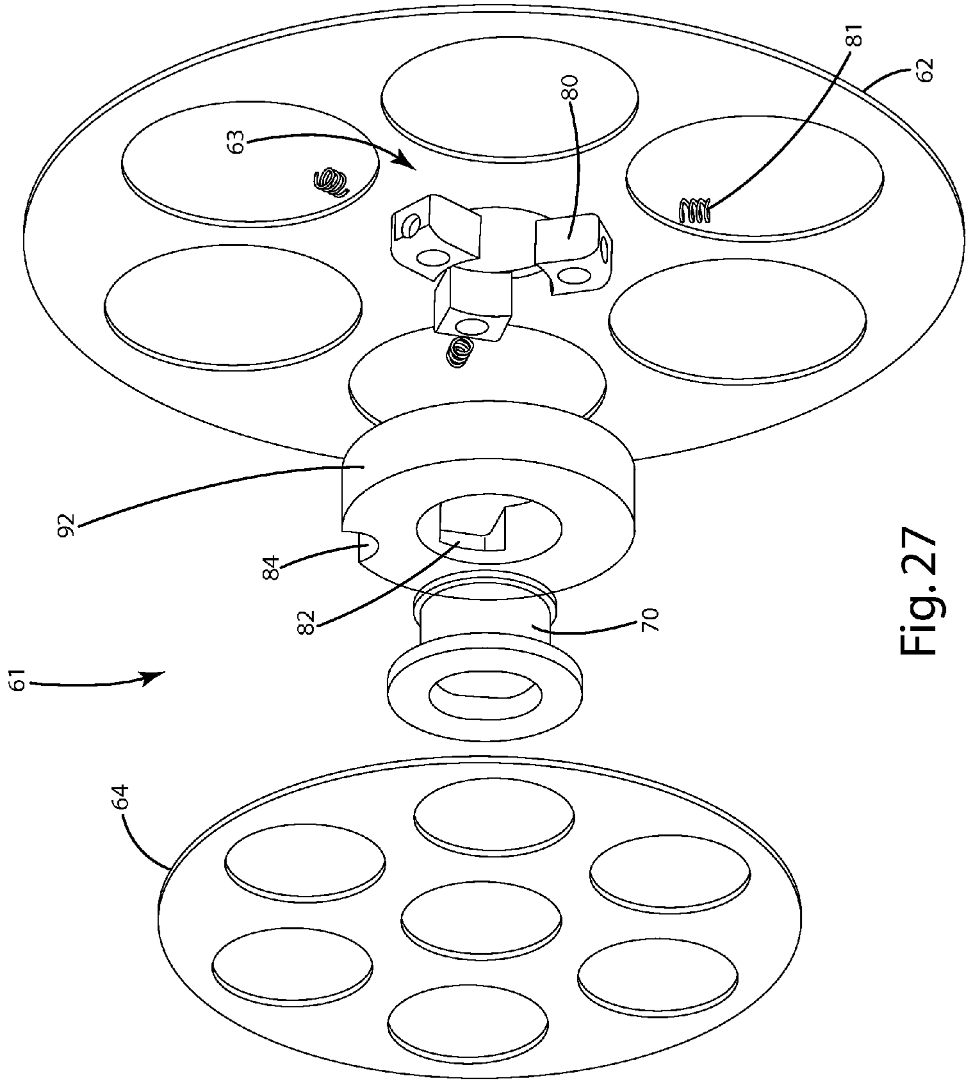
FIG. 27 is an exploded view of the rewind wheel assembly.
Figure 28:
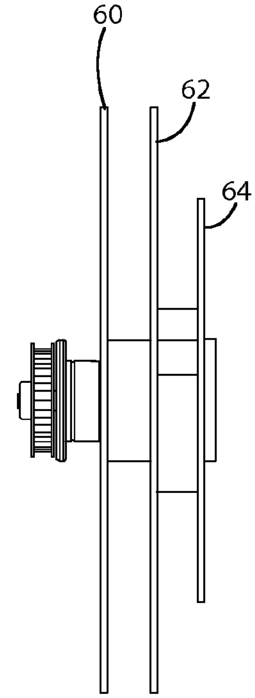
FIG. 28 is a side view of the rewind wheel assembly.
Figure 29:
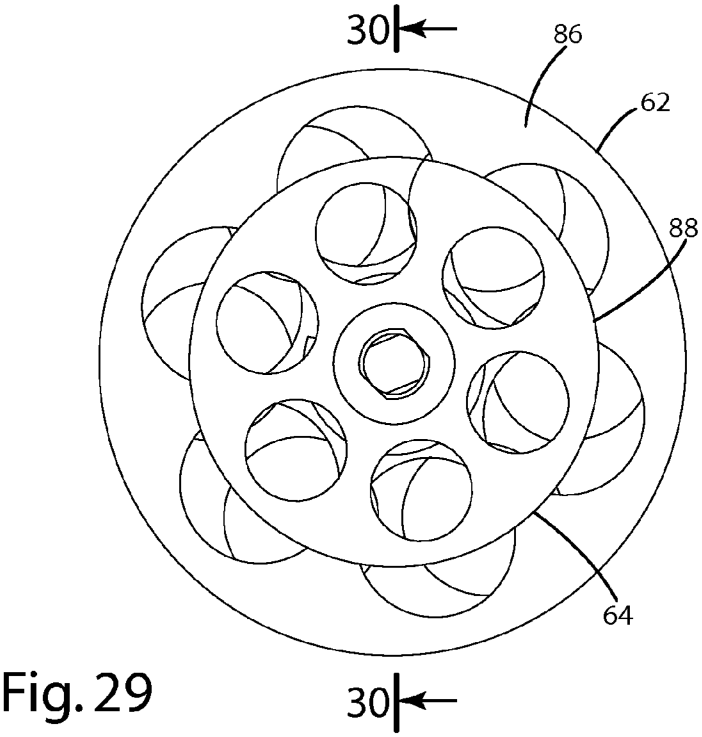
FIG. 29 is a front view of the rewind wheel assembly.
Figure 30:
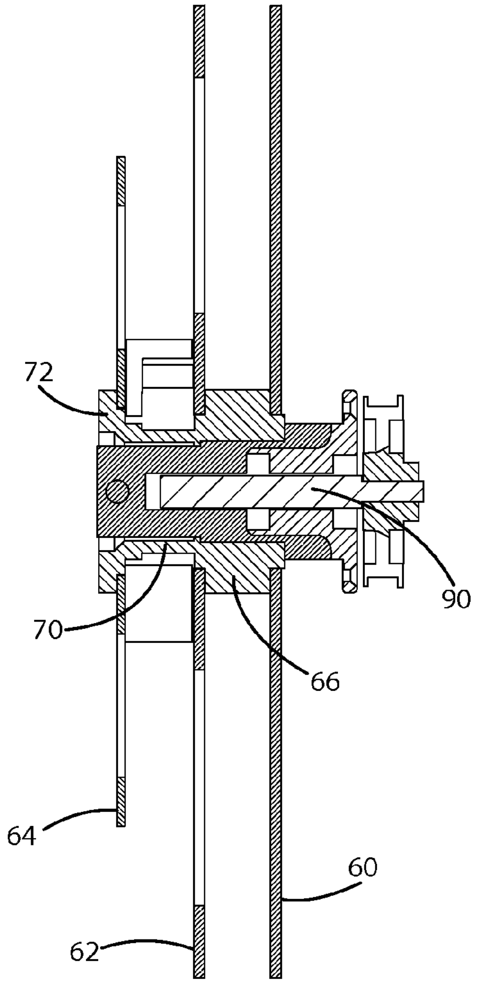
FIG. 30 is a cross-sectional view of the rewind wheel assembly.
Figure 31:
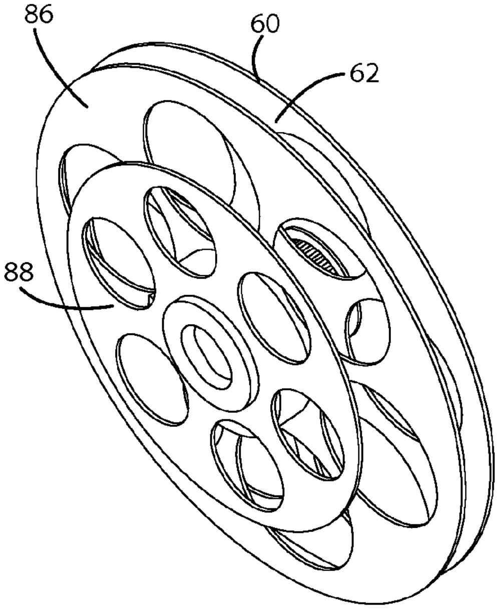
FIG. 31 is a front perspective view of the rewind wheel assembly.

As shown in FIG. 27, in one embodiment, the gripping mechanism 63 may include one or more spring loaded gripping elements 80 that are fitted into notches 82 in the inside of the rewind hub. More particularly, the gripping elements 80 are small blocks of any of a variety of materials that include cutouts to receive springs 81. The gripping elements 80 put a desired degree of tension on the label rewind core, such that the rewind hub 92 rotates with the core, but is capable of slipping with respect to the core. In one embodiment, the rate of rotation of the axle is such that the rewind hub 92 always slips with respect to the core. The amount of slip can increase as the diameter of the waste liner on the rewind hub 92 increases. In another embodiment, an alternative clutch mechanism may be attached to the rewind disc assembly 61.

Optionally, the waste liner rewind hub 92 may include an indent 84 in the outer circumference of the hub to allow a finger or other device to be placed under the rewound waste liner to improve and simplify removal of the waste liner. The waste liner hub 92 may be removable from the labeller 10, for instance, by pulling the rewind hub 92 and the third disc 64 off the labeller.

One of the waste liner rewind discs 62 or 64 can include a pin or other device (not shown) inserted or rotated in the outer circumference of the hub to extend the hub outer circumference while the waste liner is being rewound. The device could be removed or rotated to decrease the waste liner rewind disc circumference making it easier to remove the waste liner by decreasing the of the waste liner tension against the waste liner rewind disc.

The rotating components of the labeller 10 can be driven by any suitable drive arrangement. In one embodiment, the labeller includes a single drive motor 100, connected to the drive wheel 17 for driving the various labeller components. The drive motor 100 drives the drive wheel 17 to rotate, which may drive the label web, label wheel, and waste liner wheel to rotate by pulling the release liner. Multiple gears (such as the drive wheel gear 98 and the turret gear 40 shown in FIG. 3) may be linked together with one or more intermediate gears (not shown), or one or more belts to drive the individual components. In another embodiment, labeller 10 may be driven by multiple drives 100 that are be synchronized to move and/or rotate the various components in time with each other and/or at different speeds and/or different intervals during the label dispense and application cycle.

The labeller drive 100 may be a DC electric motor, an AC electric motor, a stepper motor, a servo motor, a pneumatic or hydraulic motor, an electric or pneumatic or hydraulic linear or rotary cylinder (FIG. 32). The labeller drive can optionally start and stop intermittently or operate continuously. The cycle activation of the labeller drive 100 can be electrically connected to the controller to signal the motor to start and/or stop intermittently or continuously as a function of another one of the labeller components, such as the encoder output, print mechanism output, or an external sensor output signal. The external sensor 102 may be used to control the speed of the labeller 10. In one embodiment, the sensor 102 may be a photo-optic, inductive, capacitive, ultrasonic, laser or mechanical switch that can detect the product and/or support mechanisms, calculate the product speed and signal the controller to adjust the labeller speed.

Another labeller embodiment is shown in FIGS. 39-43. This embodiment provides an alternative mechanism to account for the fact that the distance that the label rewind hub 92 must rotate to wind a particular amount of waste liner 13 decreases as the diameter of the waste liner 13 increases. In this embodiment, the labeller 200 includes a separate rewind wheel drive motor 210 that can be actuated to rotate the rewind wheel 88. The rewind drive 210 may have a wheel 214 connected to the rewind drive pulley 96 by a belt (not shown). In one embodiment, the waste liner 13 is routed around idler pulleys 211 on a rewind tension arm 215. A proximity switch 212 is positioned on the frame 12 near the tension arm 215. When a predetermined threshold level of tension is applied to the tension arm 215 by the release liner 13, the movement of the tension arm 215 activates the proximity switch 212, which causes the rewind motor to advance the rewind wheel and take-up any slack in the release liner 13. As with the labeller drive 100, the rewind drive 210 may be a variety of types of drive motors.

Also in the FIG. 39-43 embodiment, the peel plate 228 includes a peel plate roller 230, which is a thin roller that forms the edge of the peel plate 228, about which the label web 11 is drawn to separate the labels from the label web 11. The peel plate roller 230 reduces friction on the label web 11 to prevent the label web 11 from breaking as it passes over the peel plate 228. The FIG. 39-43 embodiment additionally includes a pressure/vacuum manifold 240 attached to the frame 12 for supporting the positive pressure supply 41 and the vacuum supply 43.

II. Operation

In operation, the labeller 10 may begin by actuating the drive motor 100 to begin indexing the label web 11. The motor 100 may be electrically connected to the controller and a under input interface, such that the motor 100 is actuate by the controller after a particular input by the user. When the motor is actuated, the drive wheel 17 rotates at least an amount to index one label past the peel plate and onto the tamping face 32 of a bellows 30. In one embodiment, the drive wheel 17 may include a series of protrusions around its circumference that interfit with holes in the release liner to aid in pulling the label web 11 from the label wheel and around the various idler pulleys and other components to the peel plate 28. The rotation of the drive wheel 17 alone may pull the label web 11 off the label wheel 86 and around the peel plate 28, and may pull the waste release liner 13 onto the rewind wheel 88. In another embodiment, the drive gear 98 opposite the drive wheel 17 may be connected to other labeller components, such as the label wheel 86 and rewind wheel 88 to aid in driving the label web 11.

As the label web 11 is pulled around the peel plate 28, the labels are separated from the release liner 13. The release liner 13 is then pulled around the drive wheel 17, and the tapered pulleys 94, which help to direct the release liner on to the rewind wheel 88. The release liner is pulled around the pulley held by the tension arm 107, and wound onto the rewind wheel 88. As noted above, as additional release liner 13 is pulled onto the rewind wheel 88, the slip mechanism allows the hub 92 to slip with respect to the core 70, which accounts for the fact that the distance that the label rewind hub 92 must rotate to wind a particular amount of waste liner 13 decreases as the diameter of the waste liner 13 increases. In one embodiment, the rewind wheel may be large enough to accommodate the release liner 13 from an entire label web roll, such that the rewind wheel 88 does not need to be removed and emptied until the label roll has been completely used.

In an embodiment including a print mechanism, as the label web 11 is indexed, the print mechanism 104 may print a desired printed material onto each individual label. The print registration is controlled by the pinch roller 103 and the encoder 105, which may interact with the controller and a user input interface to print the correct printed material at the correct location and with the correct contrast and resolution.

As the labels are indexed over the peel plate 28, the position of the labels may be monitored by a sensor 34, such as an optical sensor, which may communicate with the controller to actuate the motor 100, or another motor, to drive the turret gear 40 and the turret 26. The turret then rotates to move a tamping bellows 30 to the label position, wherein the bellows 30 communicates with the positive pressure source via the positive pressure port 42 to extend the bellows 30 and tamp the label onto a product.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property of privilege is claimed are defined as follows:

1. A labeller comprising:

a frame for supporting a plurality of labeller components;

a tamping bellows connected to said frame, said bellows including a tamping face that is moveable between a retracted position and an extended tamping position;

a label wheel mounted on a rotating shaft extending from said frame, said label wheel capable of supporting a label web, said label web including a release liner and a plurality of labels attached to said release liner;

a peel plate mounted to said frame adjacent to said tamping bellows, said peel plate including an upper surface, a lower surface and a terminal end, wherein said label web can be drawn around said terminal end to separate said labels from said release liner;

a drive wheel mounted to said frame, said release liner extending around at least a portion of said drive wheel, said drive wheel capable of pulling said release liner from said label wheel and around said terminal end of said peel plate; and a waste liner rewind wheel mounted on said rotating shaft, said waste liner rewind wheel capable of supporting said release liner by winding said release liner about said shaft, wherein said waste liner rewind wheel is capable of rotating at a variable speed about said rotating shaft, such that said waste liner rewind wheel can change speed to accommodate for the increasing diameter in said release liner as said release liner is wound about said shaft.

2. The labeller of claim 1 wherein said label wheel includes a first disk adjacent said frame, a second disk, and a hub between said first disk and said second disk, said shaft extending through said hub, said hub having an outer surface for supporting said label web in a roll that is wound around said hub.

3. The labeller of claim 2 wherein said waste liner rewind wheel includes said second disk, a third disk, and a rewind wheel hub between said second disk and said third disk, said shaft extending through said rewind wheel hub, said release liner capable of being wound about said rewind wheel hub.

4. The labeller of claim 3 wherein said waste liner rewind wheel includes a rewind wheel core positioned between said shaft and said rewind wheel hub, said core having an outer surface, said rewind wheel hub having an inner surface that frictionally engages said outer surface of said core, whereby said rewind wheel hub rotates with said core when said shaft is rotated, but said rewind wheel hub is capable of slipping with respect to said core when sufficient tension is applied to said rewind wheel hub.

5. The labeller of claim 4 wherein said hub defines a recess facing said core, and wherein said hub includes a gripping element positioned within said recess and a spring positioned in said recess between said gripping element and said core, said spring biasing said gripping element against said core.

6. The labeller of claim 1 including at least one roller mounted to said frame, said roller capable of directing said label web along a label path from said label wheel to said peel plate, wherein said labeller includes a print mechanism mounted to said frame between said roller and said peel plate, said print mechanism positioned adjacent to said label path such that said print mechanism is capable of printing on said labels as they pass from said label wheel to said peel plate.

7. The labeller of claim 6 wherein said labeller includes a rotary encoder mounted to said frame, said rotary encoder positioned between said label wheel and said print mechanism, such that said label web can be routed around said rotary encoder, said rotary encoder programmed to register said label web and said labels at a desired position with respect to said print mechanism.

8. The labeller of claim 7 including a pinch roller mounted to said frame adjacent to said at least one roller, said pinch roller positioned to press said label web between said pinch roller and said at least one roller.

9. The labeller of claim 8 including a label position sensor mounted to said frame, said label position sensor capable of sensing a position of said label web.

10. The labeller of claim 9 wherein said labeller includes a controller in communication with said encoder, said print mechanism and said label position sensor, said controller programmed to adjust at least one of the rotary position of said encoder and a characteristic of said print mechanism as a function of a label position signal received from said label position sensor.

11. The labeller of claim 10 wherein said turret includes an inner surface facing said frame, an outer surface opposite said inner surface, and an outer circumferential surface, said inner surface defining a plurality of port holes, each of said port holes extending through said turret to said outer circumferential surface, wherein each of said port holes is in fluid communication with one of said bellows.

12. The labeller of claim 11 wherein said frame includes a vacuum port in fluid communication with a vacuum source and a positive pressure port in fluid communication with a positive pressure source, said vacuum port defining an opening extending around a first portion of said turret shaft, said pressure port defining an opening extending around a second portion of said turret shaft, said turret inner surface abutting said frame and aligned with said vacuum port and said positive pressure port such that said port holes on said turret are in fluid communication with said vacuum port and said vacuum source when they are rotated over said vacuum port and in fluid communication with said positive pressure port and said positive pressure source when they are rotated over said positive pressure port.

13. The labeller of claim 12 wherein said frame is a single, unitary piece.

14. A labeller comprising:

a frame for supporting a plurality of labeller components;

a rotatable turret mounted to said frame, said turret rotatable about a turret shaft extending from said frame;

a plurality of tamping bellows supported on said turret, said bellows including a tamping face that is moveable between a retracted position and an extended tamping position;

a label wheel mounted on said frame, said label wheel capable of supporting a label web, said label web including a release liner and a plurality of labels attached to said release liner;

a peel plate mounted to said frame adjacent to said tamping bellows, said peel plate including an upper surface, a lower surface and a terminal end, wherein said label web can be drawn around said terminal end to separate said labels from said release liner;

a drive wheel mounted to said frame, said drive wheel mechanically linked to said rotatable turret such that said turret and said drive wheel move in time with each other, said drive wheel capable of pulling said label web along a label path from said label wheel and around said terminal end of said peel plate; and a print mechanism mounted to said frame, said print mechanism positioned adjacent said label path between said label wheel and said peel plate such that said print mechanism is capable of printing a desired print material on said labels as they pass from said label wheel to said peel plate.

15. The labeller of claim 14 wherein said print mechanism is movable on said frame along said label path.

16. The labeller of claim 14 including a motor connected to said drive wheel, a rotary encoder mounted to said frame, and a controller in electrical communication with said motor, said encoder and said print mechanism, said encoder positioned between said label wheel and said print mechanism, such that said label web can be routed around said rotary encoder, said encoder capable of sending an output signal to said controller, said controller programmed to control said motor and said print mechanism as a function of said encoder output signal.

17. The labeller of claim 16 including a label position sensor mounted to said frame, said label position sensor positioned along said label path between said print mechanism and said peel plate, said label sensor capable of sensing a position of one of said labels with respect to said at least one bellows as said label web moves past said label position sensor.

18. The labeller of claim 17 including a user input interface in electrical communication with said controller and said print mechanism, such that a user may input a desired printed material into said user input interface and said print mechanism prints the desired printed material onto one or more of said labels.

* * * * *